United States Patent
Haydon et al.

(10) Patent No.: US 10,927,288 B2
(45) Date of Patent: Feb. 23, 2021

(54) CEMENT ACTIVATOR COMPOSITION FOR TREATMENT OF SUBTERRANEAN FORMATIONS

(71) Applicant: Halliburton Energy Services, Inc., Houston, TX (US)

(72) Inventors: Janelle Haydon, Williston, ND (US); Sean William Riggio, Houston, TX (US); Kyriacos Agapiou, Houston, TX (US); Thomas Jason Pisklak, Cypress, TX (US); Samuel Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/747,695

(22) PCT Filed: Aug. 25, 2015

(86) PCT No.: PCT/US2015/046702
§ 371 (c)(1),
(2) Date: Jan. 25, 2018

(87) PCT Pub. No.: WO2017/034547
PCT Pub. Date: Mar. 2, 2017

(65) Prior Publication Data
US 2018/0230357 A1    Aug. 16, 2018

(51) Int. Cl.
*C09K 8/467* (2006.01)
*C09K 8/42* (2006.01)
(Continued)

(52) U.S. Cl.
CPC ............ *C09K 8/467* (2013.01); *C04B 22/147* (2013.01); *C04B 22/16* (2013.01); *C04B 24/20* (2013.01); *C04B 24/2652* (2013.01); *C04B 28/02* (2013.01); *C04B 28/06* (2013.01); *C04B 28/08* (2013.01); *C04B 28/14* (2013.01); *C04B 28/18* (2013.01); *C04B 40/0658* (2013.01);
(Continued)

(58) Field of Classification Search
CPC ........... C09K 8/42; C09K 8/467; E21B 33/14; C04B 22/147; C04B 22/16; C04B 24/20; C04B 28/02; C04B 2103/10
See application file for complete search history.

(56) References Cited

U.S. PATENT DOCUMENTS

| | | | |
|---|---|---|---|
| 4,607,066 A * | 8/1986 | Barry | ...................... E21D 11/38 166/294 |
| 5,447,197 A | 9/1995 | Rae et al. | |

(Continued)

OTHER PUBLICATIONS

Practical Handbook of Marine Science by CRC, 2001, p. 76. (Year: 2001).*
International Search Report and Written Opinion dated Oct. 29, 2015, for PCT Application No. PCT/US2015/046702 filed on Aug. 25, 2015.

*Primary Examiner* — Aiqun Li
(74) *Attorney, Agent, or Firm* — Chamberlain Hrdlicka

(57) ABSTRACT

Various embodiments disclosed relate to cement activator compositions for treatment of subterranean formations. In various embodiments, the present invention provides a method of treating a subterranean formation including placing in the subterranean formation a liquid cement activator composition including water, an alkali sulfate salt, a polyphosphate salt, and a stabilizer polymer.

17 Claims, 7 Drawing Sheets

(51) Int. Cl.
  *C04B 28/18* (2006.01)
  *C04B 28/06* (2006.01)
  *C04B 40/06* (2006.01)
  *C04B 24/26* (2006.01)
  *C04B 22/14* (2006.01)
  *C04B 22/16* (2006.01)
  *C04B 28/02* (2006.01)
  *E21B 33/14* (2006.01)
  *C04B 28/14* (2006.01)
  *C04B 28/08* (2006.01)
  *C04B 24/20* (2006.01)
  *C04B 103/10* (2006.01)

(52) U.S. Cl.
  CPC ............. *C09K 8/428* (2013.01); *E21B 33/14* (2013.01); *C04B 2103/10* (2013.01)

(56) References Cited

U.S. PATENT DOCUMENTS

| | | | |
|---|---|---|---|
| 2005/0124503 A1 | 6/2005 | Morgan et al. | |
| 2006/0234871 A1* | 10/2006 | Dalrymple | C09K 8/428 |
| | | | 507/211 |
| 2012/0325478 A1* | 12/2012 | Muthusamy | C04B 28/021 |
| | | | 166/293 |
| 2013/0248183 A1 | 9/2013 | Pisklak et al. | |
| 2013/0255949 A1 | 10/2013 | Kellum et al. | |
| 2013/0324443 A1* | 12/2013 | Wang | C04B 24/163 |
| | | | 507/121 |
| 2014/0034314 A1* | 2/2014 | Lewis | E21B 33/138 |
| | | | 166/292 |
| 2014/0083701 A1 | 3/2014 | Boul et al. | |
| 2015/0197033 A1 | 7/2015 | Agapiou et al. | |

\* cited by examiner

US 10,927,288 B2

CEMENT ACTIVATOR COMPOSITION FOR TREATMENT OF SUBTERRANEAN FORMATIONS

BACKGROUND

Cements play an important role in wellbore integrity. Cements may be used in primary cementing operations whereby pipe strings, such as casing and liners, are cemented in well bores. In a typical primary cementing operation, a cement may be pumped into an annulus between the exterior surface of the pipe string disposed therein and the walls of the well bore (or a larger conduit in the well bore). The cement may set in the annulus, thereby forming an annular sheath of hardened, substantially impermeable material (e.g., a cement sheath) that may support and position the pipe string in the well bore and may bond the exterior surface of the pipe string to the well bore walls (or to the larger conduit). Cements may also be used in remedial cementing methods, such as in squeeze cementing for sealing voids in a pipe string, cement sheath, gravel pack, subterranean formation, and the like.

A broad variety of cement compositions have been used in subterranean cementing operations. In some instances, set-delayed cement compositions have been used. Set-delayed cement compositions are characterized by remaining in a pumpable fluid state for at least about one day (e.g., at least about 7 days, about 2 weeks, or about 2 years or more) at room temperature (e.g., about 20-30° C.) in quiescent storage. When desired for use, the set-delayed cement compositions should be capable of being activated whereby reasonable compressive strengths are developed. For example, an activating composition can be added to a set-delayed cement composition whereby the composition cures (e.g., sets) into a hardened mass.

A number of activating compositions may be employed to activate or accelerate curing of cementitious compositions. However, within 24 hours, many activating compositions exhibit separation or form a gelled mass that cannot be returned to a uniformly dispersed suspension even with application shear or agitation. Consequently, many activating compositions must be prepared immediately prior to use, which can present many disadvantages including operational disruptions due to the need for having material prepared on location.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
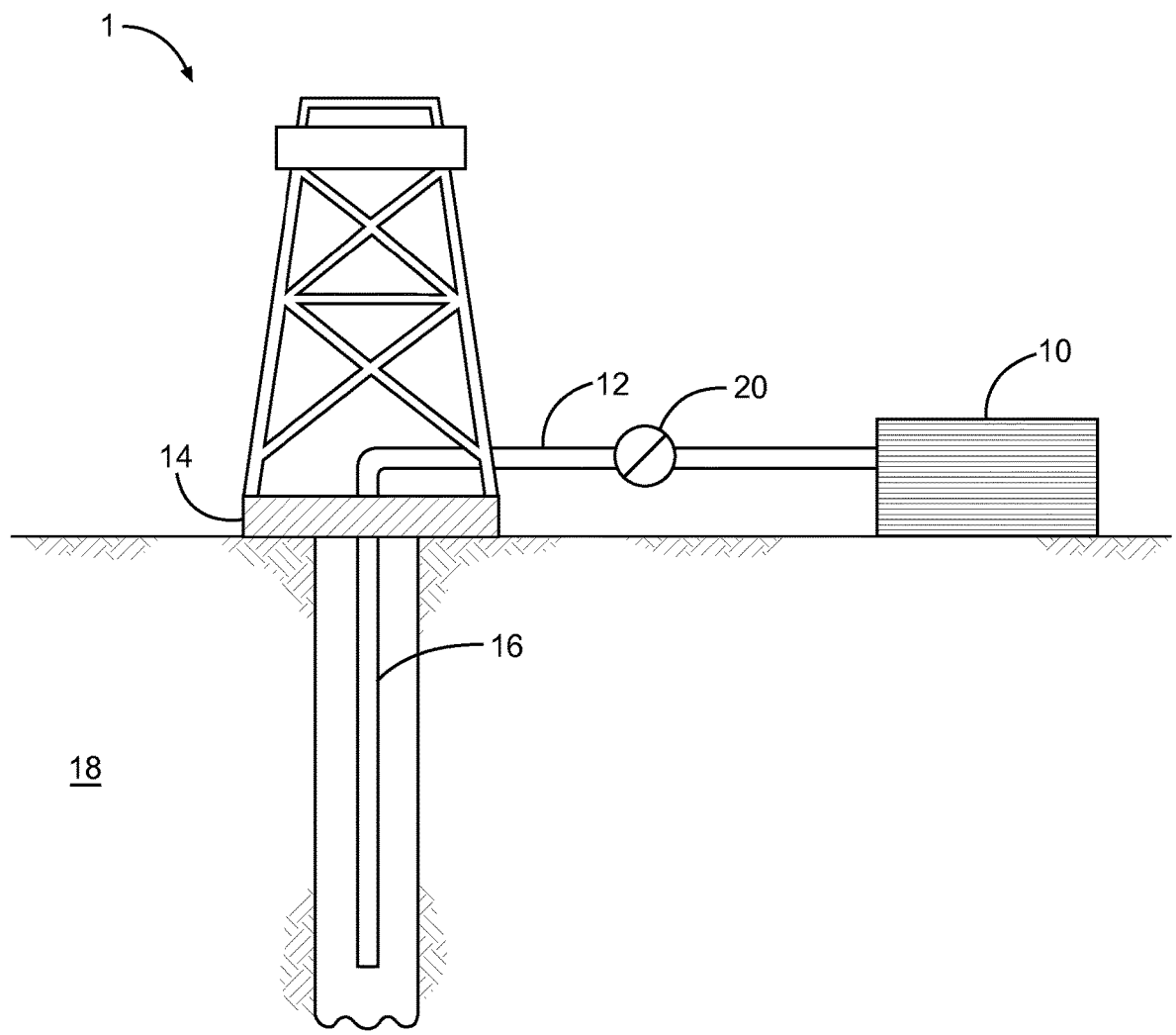
FIG. 1 illustrates a system or apparatus for delivering a composition to a subterranean formation, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. For example, an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "heterocyclyl" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A hydrocarbyl group can be a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a-C_b)$hydrocarbyl, wherein a and b are positive integers and mean having any of a to b number of carbon atoms. For example, $(C_1-C_4)$hydrocarbyl means the hydrocarbyl group can be methyl $(C_1)$, ethyl $(C_2)$, propyl $(C_3)$, or butyl $(C_4)$, and $(C_0-C_b)$hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "number-average molecular weight" ($M_n$) as used herein refers to the ordinary arithmetic mean of the molecular weight of individual molecules in a sample. It is defined as the total weight of all molecules in a sample divided by the total number of molecules in the sample. Experimentally, $M_n$ is determined by analyzing a sample divided into molecular weight fractions of species i having $n_i$ molecules of molecular weight $M_i$ through the formula $M_n=\Sigma M_i n_i/\Sigma n_i$. The $M_n$ can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i/\Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thio sulfate, sulfite, carbonate, chromate, dichromate, peroxide, or oxalate.

The polymers described herein can terminate in any suitable way. In some embodiments, the polymers can terminate with an end group that is independently chosen from a suitable polymerization initiator, —H, —OH, a substituted or unsubstituted ($C_1$-$C_{20}$)hydrocarbyl (e.g., ($C_1$-$C_{10}$)alkyl or ($C_6$-$C_{20}$)aryl) interrupted with 0, 1, 2, or 3 groups independently selected from the group consisting of —O—, substituted or unsubstituted —NH—, and —S—, a poly(substituted or unsubstituted ($C_1$-$C_{20}$)hydrocarbyloxy), and a poly(substituted or unsubstituted ($C_1$-$C_{20}$)hydrocarbylamino).

In various embodiments, the present invention provides a method of treating a subterranean formation. The method includes placing in the subterranean formation a liquid cement activator composition including water, an alkali sulfate salt, a polyphosphate salt, and a stabilizer polymer. The stabilizer polymer includes a repeating group that is an ethylene substituted with a group selected from the group consisting of —C(O)OH, a salt thereof, a substituted or unsubstituted ($C_1$-$C_{20}$)hydrocarbyl ester thereof; —C(O)NR$^1_2$, wherein at each occurrence R$^1$ is independently selected from the group consisting of a substituted or unsubstituted ($C_1$-$C_{20}$)hydrocarbyl; —CN; and combinations thereof. At each occurrence the ethylene is independently further substituted or unsubstituted. The stabilizer polymer also includes a repeating group that includes an anionic group.

In various embodiments, the present invention provides a method of treating a subterranean formation. The method includes placing in the subterranean formation a composition including a liquid cement activator composition. The liquid cement activator composition includes water, an alkali sulfate salt, a polyphosphate salt, and a stabilizer polymer. The water is about 30 wt % to about 95 wt % of the liquid cement activator composition. The alkali sulfate salt is about 0.001 wt % to about 40 wt % of the liquid cement activator composition. The polyphosphate salt is about 0.001 wt % to about 30 wt % of the liquid cement activator composition. The stabilizer polymer is about 0.001 wt % to about 30 wt % of the liquid cement activator composition. The stabilizer polymer includes repeating groups having the structure:

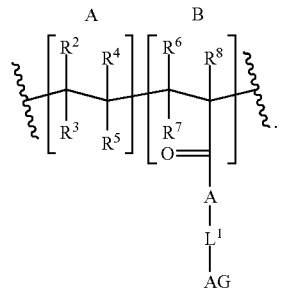

At each occurrence, the repeating units independently occur in the direction shown or in the opposite direction. The repeating units have a block or random copolymer arrangement. The variables R$^2$, R$^3$, and R$^4$ are independently selected from the group consisting of —H, and substituted or unsubstituted ($C_1$-$C_{50}$)hydrocarbyl interrupted by 0, 1, 2, or 3 groups independently selected from the group consisting of —O—, —S—, substituted or unsubstituted —NH—, —($CH_2$—$CH_2$—O)$_{n1}$—, and —($CH_2$—$CH_2$—$CH_2$—O)$_{n1}$—, wherein n1 is about 1 to about 10,000. The variable R$^5$ is independently selected from the group consisting of C(O)OH, a salt thereof, a substituted or unsubstituted ($C_1$-$C_{20}$)hydrocarbyl ester thereof; —C(O)NR$^1_2$, wherein at each occurrence R$^1$ is independently selected from the group consisting of a substituted or unsubstituted ($C_1$-$C_{20}$)hydrocarbyl; and —CN. The variable A is selected from the group consisting of —O— and —NR$^9$—. The variables R$^6$, R$^7$, R$^8$, R$^9$ are independently selected from the group consisting of —H, and a substituted or unsubstituted ($C_1$-$C_{50}$)hydrocarbyl interrupted by 0, 1, 2, or 3 groups independently selected from the group consisting of —O—, —S—, substituted or unsubstituted —NH—, —($CH_2$—$CH_2$—O)$_{n2}$—, and —($CH_2$—$CH_2$—$CH_2$—O)$_{n2}$—, wherein n2 is about 1 to about 10,000. The variable L$^1$ is selected from the group consisting of a bond and a substituted or unsubstituted ($C_1$-$C_{50}$)hydrocarbylene interrupted by 0, 1, 2, or 3 groups independently selected from the group consisting of —O—, —S—, substituted or unsubstituted —NH—, —($CH_2$—$CH_2$—O)$_{n3}$—, and —($CH_2$—$CH_2$—$CH_2$—O)$_{n3}$—, wherein n3 is about 1 to about 10,000. The variable AG is the anionic group. Repeating group A is about 0.001 mol % to about 25 mol % of the stabilizer polymer. Repeating group B is about 25 mol % to about 99.999 mol % of the stabilizer polymer.

In various embodiments, the present invention provides a method of treating a subterranean formation. The method includes placing in the subterranean formation a liquid cement activator composition including water, an alkali sulfate salt, a polyphosphate salt, and a stabilizer polymer. The water is about 30 wt % to about 95 wt % of the liquid cement activator composition. The alkali sulfate salt is about 0.001 wt % to about 40 wt % of the liquid cement activator composition. The polyphosphate salt is about 0.001 wt % to about 30 wt % of the liquid cement activator composition. The stabilizer polymer is about 0.001 wt % to about 30 wt % of the liquid cement activator composition. The stabilizer polymer includes repeating groups having the structure:

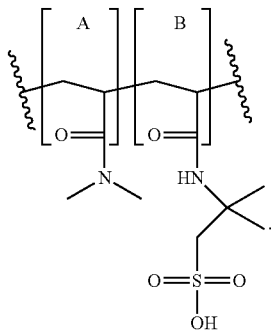

At each occurrence, the repeating units independently occur in the direction shown or in the opposite direction. The repeating units have a block or random copolymer arrangement. The —S(O)(O)OH group is in the form of an acid or a salt thereof. Repeating group A is about 0.001 mol % to about 25 mol % of the stabilizer polymer. Repeating group B is about 25 mol % to about 99.999 mol % of the stabilizer polymer.

In various embodiments, the present invention provides a system including a tubular disposed in a subterranean formation. The system also includes a pump configured to pump a liquid cement activator composition in the subterranean formation through the tubular. The cement activator composition includes water, an alkali sulfate salt, a polyphosphate salt, and a stabilizer polymer. The stabilizer polymer includes a repeating group that is an ethylene substituted with a group selected from the group consisting of —C(O)OH, a salt thereof, a substituted or unsubstituted $(C_1$-$C_{20})$hydrocarbyl ester thereof; —C(O)NR$^1_2$, wherein at each occurrence R$^1$ is independently selected from the group consisting of a substituted or unsubstituted $(C_1$-$C_{20})$hydrocarbyl; —CN; and combinations thereof. At each occurrence the ethylene is independently further substituted or unsubstituted. The stabilizer polymer also includes a repeating group that includes an anionic group.

In various embodiments, the present invention provides a liquid cement activator composition for treatment of a subterranean formation. The cement activator composition includes water, an alkali sulfate salt, a polyphosphate salt, and a stabilizer polymer. The stabilizer polymer includes a repeating group that is an ethylene substituted with a group selected from the group consisting of —C(O)OH, a salt thereof, a substituted or unsubstituted $(C_1$-$C_{20})$hydrocarbyl ester thereof; —C(O)NR$^1_2$, wherein at each occurrence R$^1$ is independently selected from the group consisting of a substituted or unsubstituted $(C_1$-$C_{20})$hydrocarbyl; and —CN. At each occurrence the ethylene is independently further substituted or unsubstituted. The stabilizer polymer also includes a repeating group that includes an anionic group.

In various embodiments, the present invention provides a liquid cement activator composition for treatment of a subterranean formation. The cement activator composition includes includes water, an alkali sulfate salt, a polyphosphate salt, and a stabilizer polymer. The water is about 30 wt % to about 95 wt % of the liquid cement activator composition. The alkali sulfate salt is about 0.001 wt % to about 40 wt % of the liquid cement activator composition. The polyphosphate salt is about 0.001 wt % to about 30 wt % of the liquid cement activator composition. The stabilizer polymer is about 0.001 wt % to about 30 wt % of the liquid cement activator composition. The stabilizer polymer includes repeating groups having the structure:

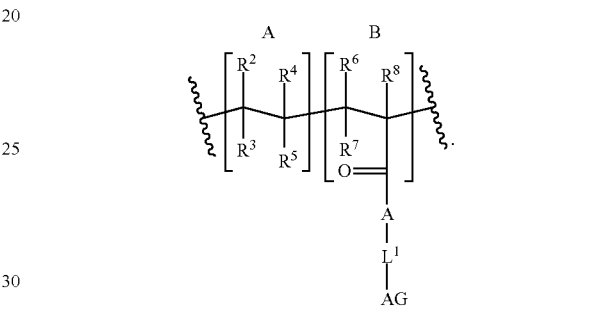

At each occurrence, the repeating units independently occur in the direction shown or in the opposite direction. The repeating units have a block or random copolymer arrangement. The variables R$^2$, R$^3$, and R$^4$ are independently selected from the group consisting of —H, and substituted or unsubstituted $(C_1$-$C_{50})$hydrocarbyl interrupted by 0, 1, 2, or 3 groups independently selected from the group consisting of —O—, —S—, substituted or unsubstituted —NH—, —(CH$_2$—CH$_2$—O)$_{n1}$—, and —(CH$_2$—CH$_2$—CH$_2$—O)$_{n1}$—, wherein n1 is about 1 to about 10,000. The variable R$^5$ is independently selected from the group consisting of C(O)OH, a salt thereof, a substituted or unsubstituted $(C_1$-$C_{20})$hydrocarbyl ester thereof; —C(O)NR$^1_2$, wherein at each occurrence R$^1$ is independently selected from the group consisting of a substituted or unsubstituted $(C_1$-$C_{20})$hydrocarbyl; and —CN. The variable A is selected from the group consisting of —O— and —NR$^9$—. The variables R$^6$, R$^7$, R$^8$, R$^9$ are independently selected from the group consisting of —H, and a substituted or unsubstituted $(C_1$-$C_{50})$hydrocarbyl interrupted by 0, 1, 2, or 3 groups independently selected from the group consisting of —O—, —S—, substituted or unsubstituted —NH—, —(CH$_2$—CH$_2$—O)$_{n2}$—, and —(CH$_2$—CH$_2$—CH$_2$—O)$_{n2}$—, wherein n2 is about 1 to about 10,000. The variable L$^1$ is selected from the group consisting of a bond and a substituted or unsubstituted $(C_1$-$C_{50})$hydrocarbylene interrupted by 0, 1, 2, or 3 groups independently selected from the group consisting of —O—, —S—, substituted or unsubstituted —NH—, —(CH$_2$—CH$_2$—O)$_{n3}$—, and —(CH$_2$—CH$_2$—CH$_2$—O)$_{n3}$—, wherein n3 is about 1 to about 10,000. The variable AG is the anionic group. Repeating group A is about 0.001 mol % to about 99.999 mol % of the stabilizer polymer. Repeating group B is about 0.001 mol % to about 99.999 mol % of the stabilizer polymer.

In various embodiments, the present invention provides a method of preparing a composition for treatment of a subterranean formation. The method includes forming a liquid cement activator composition for treatment of a subterranean formation (e.g., for combining with and activating a cement composition above-surface or downhole, for curing the cement composition in the subterranean formation). The cement activator composition includes water, an alkali sulfate salt, a polyphosphate salt, and a stabilizer polymer. The stabilizer polymer includes a repeating group that is an ethylene substituted with a group selected from the group consisting of —C(O)OH, a salt thereof, a substituted or unsubstituted $(C_1\text{-}C_{20})$hydrocarbyl ester thereof; —C(O)NR$^1_2$, wherein at each occurrence R$^1$ is independently selected from the group consisting of a substituted or unsubstituted $(C_1\text{-}C_{20})$hydrocarbyl; and —CN. At each occurrence the ethylene is independently further substituted or unsubstituted. The stabilizer polymer also includes a repeating group that includes an anionic group.

Various embodiments of the cement activator composition and method of using the same have advantages over other cement activator compositions and methods of using the same, at least some of which are unexpected. For example, in various embodiments, the cement activator composition can activate or accelerate curing of a wide variety of cement compositions, such as Portland cement compositions and lime-pozzolan cement compositions, such as set-delayed lime-pozzolan cement compositions. In some embodiments, the activator composition can have greater stability of the homogeneity of the composition, and less gelling, for longer periods, as compared to other activator compositions. In various embodiments, the increased stability of the activator composition can be independent of the viscosity of the activator composition. In various embodiments, the greater stability of the activator composition can allow it to be pre-formulated and stored for longer periods of time while remaining homogeneous, ungelled, and ready for use. In various embodiments, the greater stability of the activator composition can allow preparation of the activator composition at a convenient location and then transportation to the job site, which can reduce capital expenditures due to a reduction in the need for on-site bulk storage and mixing equipment, such as for offshore cementing operations where space onboard the vessels can be limited.

Due to limitations associated with the hydration reactivity of many set-delayed compositions, most cement activating compositions can only be used in temperatures above 60° C. in order for the activated cement compositions to develop adequate strength. However, in various embodiments, the activator composition can provide low temperature (e.g., below 60° C.) activation of cement compositions.

In some embodiments, the activator composition can have fluid loss control properties. Some cement compositions cannot be formulated with fluid loss control agents, either as a dry-blend or in a storable slurry state, or can only be formulated with a limited type and concentration of fluid loss control agents, such as due to limitations related to slurry rheology in storage. For example, addition of a fluid loss control agent to a set-delayed cement composition can cause undesirable effects in the cement composition slurry during the storage period. In various embodiments, the activator composition can impart fluid loss control properties to a cement composition activated therewith. In various embodiments, the fluid loss control properties provided by the activator composition can avoid on-site blending of fluid loss control materials with cement slurries.

Method of Treating a Subterranean Formation.

In some embodiments, the present invention provides a method of treating a subterranean formation. The method includes placing a liquid cement activator composition in a subterranean formation, such as any embodiment of the cement activator composition described herein. The placing of the cement activator composition in the subterranean formation can include contacting the cement activator composition and any suitable part of the subterranean formation, or contacting the cement activator composition and a subterranean material, such as any suitable subterranean material. The subterranean formation can be any suitable subterranean formation. In some examples, the placing of the cement activator composition in the subterranean formation includes contacting the cement activator composition with or placing the cement activator composition in at least one of a fracture, at least a part of an area surrounding a fracture, a flow pathway, an area surrounding a flow pathway, and an area desired to be fractured. The placing of the cement activator composition in the subterranean formation can be any suitable placing and can include any suitable contacting between the subterranean formation and the cement activator composition.

In some embodiments, the method includes obtaining or providing the cement activator composition. The obtaining or providing of the cement activator composition can occur at any suitable time and at any suitable location. The obtaining or providing of the cement activator composition can occur above the surface (e.g., one or more components of the cement activator composition can be combined above the surface). The obtaining or providing of the cement activator composition can occur in the subterranean formation (e.g., one or more components of the cement activator composition can be combined downhole).

In various embodiments, the method can include combining the cement activator composition with a cement composition. The combining can occur above surface, such that the placing of the cement activator composition in the subterranean formation includes placing a mixture of the cement activator composition and the cement composition in the subterranean formation. The combining can occur in the subterranean formation, such that a mixture of the cement activator composition and the cement composition is formed in the subterranean formation. The mixture of the cement activator composition and the cement composition can be a curable composition that can cure and harden. Any suitable amount of the mixture of the cement activator composition and the cement composition can be the cement activator composition, such as about 0.001 wt % to about 99.999 wt % of the combination of the cement activator composition and the cement composition, or about 10 wt % to about 50 wt %, or about 0.001 wt % or less, or less than, equal to, or greater than about 0.01 wt %, 0.1, 1, 2, 3, 4, 5, 8, 10, 12, 14, 16, 18, 20, 22, 24, 26, 28, 30, 32, 34, 36, 38, 40, 42, 44, 46, 48, 50, 55, 60, 65, 70, 75, 80, 82, 84, 86, 88, 90, 91, 92, 93, 94, 95, 96, 97, 98, 99, 99.9, 99.99 wt %, or about 99.999 wt % or more. In the mixture of the cement activator composition and a pumice-containing (e.g., pozzolan-containing) cement composition, the amount of the cement activator composition can be any suitable percent of the total weight of the pumice in the cement composition, such as about 0.001% to about 99.999%, about 60% to about 95%, about 70% to about 90%, or about 0.001% or less, or less than, equal to, or greater than about 0.01%, 0.1, 1, 2, 3, 4, 5, 6, 8, 10, 15, 20, 25, 30, 35, 40, 45, 50, 55, 60, 62, 64, 66, 68, 70, 71, 72, 73, 74, 75, 76, 77, 78, 79, 80, 81, 82, 83, 84, 85, 86, 87, 88, 89, 90, 91, 92, 93, 94, 95, 93, 97, 98, 99, 99.9, 99.99%, or about 99.999% or more.

In various embodiments, the method can include curing (e.g., hardening) a mixture that includes the cement activator composition and a cement composition, such as a pumice-containing (e.g., pozzolan-containing) cement composition. The curing can occur for any suitable time, at any suitable temperature, and at any suitable pressure, such as temperatures and pressures experienced downhole. Curing can occur for less than, equal to, or greater than 10 minutes, 20, 30, 40, 50 minutes, 1 hour, 1.5, 2, 3, 4, 5, 6, 8, 10, 12, 14, 16, 18, 20, 22 hours, 1 day, 1.5, 2, 3, 4, 5, 6 days, 1 week, 1.5, 2, 3 weeks, or about 1 month or more. Curing can occur at about 0° C. to about 500° C., or about 20° C. to about 400° C., or about 0° C. or less, or less than, equal to, or greater than about 10° C., 20, 25, 30, 35, 40, 45, 50, 60, 70, 80, 90, 100, 125, 150, 175, 200, 225, 250, 275, 300, 350, 400, 450, or about 500° C. or more.

The cured product of the mixture including the cement activator composition and the cement composition can have any suitable tensile strength, such as about 100 psi to about 10,000 psi, about 500 psi to about 1,000 psi, or about 100 psi or less, or about 150 psi, 200, 250, 300, 350, 400, 450, 500, 550, 600, 650, 700, 750, 800, 850, 900, 1,000, 1,500, 2,000, 2,500, 5,000, 7,500, or about 10,000 psi or more.

The cured product of the mixture including the cement activator composition and the cement composition can have any suitable compressive strength, such as about 50 psi to about 10,000 psi, about 300 psi to about 10,000 psi, about 1,000 psi to about 3,000 psi, about 100 psi to about 500 psi, or about 50 psi or less, or about 75 psi, 100, 125, 150, 175, 200, 225, 250, 275, 300, 325, 350, 375, 400, 450, 500, 600, 700, 800, 900, 1,000, 1,500, 2,000, 2,500, 3,000, 5,000, 7,500, or about 10,000 psi or more.

In various embodiments, the method includes cementing or repairing a wellbore in the subterranean formation. For example, the cement activator composition can be placed into an annulus between a casing and the wellbore, or between two casings, combined with a cement composition, and the mixture can then be cured. The mixture of the cement activator composition and the cement composition can be formed before placing the cement activator composition in the annulus, such that a mixture of the cement activator composition and the cement composition is placed in the annulus. In another embodiment, a cement composition can be placed in the annulus, and the cement activator composition can be added to the cement composition in the annulus to form the mixture, which can then be cured. In some examples, the method can include placing a mixture of the cement activator composition and a cement composition into a damaged region of a wellbore and then curing the mixture of the cement activator composition and the cement composition. The cement composition can either be mixed with the cement activator composition prior to placement in the desired location of curing or the cement composition can be already in-place downhole and the cement activator composition can be combined therewith.

In various embodiments, the method includes consolidating particulates downhole. For example, the method can include placing a mixture of the cement activator composition and a cement composition into a region of the subterranean formation that includes fines, gravel, or other particles, and allowing the mixture to cure such that the particles are substantially fixed in-place. In various embodiments, the method can include lost-circulation management, such as by placing a mixture of the cement activator composition and a cement composition in a subterranean region experiencing fluid loss and curing the composition. The cement composition can either be mixed with the cement activator composition prior to placement in the desired location of curing or the cement composition can be already in-place downhole and the cement activator composition can be combined therewith.

Cement Composition.

In various embodiments, the cement activator composition can be combined with a cement composition. The cement composition can be any suitable cement composition that can undergo curing to form a cured cement, such as curing after combination with the cement activator composition. The cement composition can include any suitable type of cement, such as a hydraulic cement. The cement composition can include a cement including calcium, aluminum, silicon, oxygen, iron, or sulfur, which can set and harden by reaction with water. The cement composition can include Portland cement, pozzolana cement, gypsum cement, high alumina content cement, slag cement, silica cement, or a combination thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. The cement composition can include pozzolana cement, such as pozzolana-lime cement. The cement composition can be a delayed-set cement composition. The cement composition can include any suitable amount of cement therein, such as about 10 wt % to about 100 wt %, or about 10 wt % or less, or less than, equal to, or more than about 12 wt %, 14, 16, 18, 20, 25, 30, 35, 40, 45, 50, 55, 60, 65, 70, 75, 80, 85, 90, 91, 92, 93, 94, 95, 96, 97, 98, or about 99 wt % or more. The cement composition can be a dry cement composition, or a slurry (e.g., including water). A slurry cement composition can include any suitable amount of water, such as about 10 wt % to about 95 wt %, or less than, equal to, or greater than about 12 wt %, 14, 16, 18, 20, 25, 30, 35, 40, 45, 50, 55, 60, 65, 70, 75, 80, 85, 90, 91, 92, 93, 94 wt %, or about 95 wt % or more.

A cement composition can include cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement composition can include cement kiln dust but no cement, cement kiln dust and cement, or cement but no cement kiln dust. A cement kiln dust can be present in an amount of about 0.001 wt % to about 95 wt %, or about 0.001 wt % or less, or less than, equal to, or greater than about 0.01%, 0.1, 1, 2, 3, 4, 5, 6, 8, 10, 15, 20, 25, 30, 35, 40, 45, 50, 55, 60, 65, 70, 75, 80, 85, 90 wt %, or about 95 wt % or more.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the composition or a mixture including the same. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

Cement Activator Composition.

The liquid (e.g., heterogeneous or homogeneous liquid) cement activator composition can be combined with a cement composition to produce a mixture that can set and cure to a hardened material. The cement activator composition can be stable, substantially avoiding separation (e.g., substantially remaining homogeneous) and substantially avoiding gelling (e.g., substantially avoiding an increase in viscosity), such as for about 1 day to about 5 years or more, for about 1 day to about 5 months, for about 1 day to about 5 weeks, or for at least about 1 day or less, or for at least about 2 days, 3, 4, 5, 6 days, 1 week, 1.5, 2, 2.5, 3 weeks, 1 month, 1.5, 2, 3, 4, 5, 6, 7, 8, 9, 10, 11 months, 1 year, 1.5, 2, 3, 4, or for about 5 years or more.

The cement activator composition can include water. The water can be any suitable water, such as fresh water, brine, produced water, flowback water, brackish water, sea water, or a combination thereof. The water can form any suitable proportion of the cement activator composition, such as about 30 wt % to about 95 wt % of the cement activator composition, 60 wt % to about 80 wt %, or about 30 wt % or less, or less than, equal to, or greater than about 35 wt %, 40, 45, 50, 55, 60, 62, 64, 65, 66, 67, 68, 69, 70, 71, 72, 73, 74, 75, 76, 77, 78, 79, 80, 82, 84, 86, 88, 90 wt %, or about 95 wt % or more of the cement activator composition. In a mixture including the cement activator composition and a cement composition including pumice, the water in the cement activator composition can be any suitable percent of the total weight of pumice, such as about 10% to about 90%, about 40% to about 80%, or about 10% or less, or less than, equal to, or greater than about 15%, 20, 25, 30, 35, 40, 42, 44, 46, 48, 50, 51, 52, 53, 54, 55, 56, 57, 58, 59, 60, 62, 64, 66, 68, 70, 75, 80, 85%, or about 90% or more. The liquid cement activator composition can be an aqueous composition, wherein the balance of the composition is water (e.g., aside from the alkali sulfate salt, the polyphosphate salt, the stabilizer polymer, and any other components, the composition can be water).

The cement activator composition can include an alkali sulfate salt. The activator composition can include one alkali sulfate salt, or more than one alkali sulfate salt. The alkali sulfate salt can be any suitable alkali sulfate salt, such that the cement activator composition can be used as described herein, such as potassium sulfate, calcium sulfate, lithium sulfate, sodium sulfate, or a combination thereof. The alkali sulfate salt can be sodium sulfate. The one or more alkali sulfate salts can be any suitable proportion of the cement activator composition, such as about 0.001 wt % to about 40 wt % of the cement activator composition, about 1 wt % to about 15 wt %, or about 0.001 wt % or less, or less than, equal to, or more than about 0.01 wt %, 0.1, 1, 2, 3, 4, 5, 5.5, 6, 6.5, 7, 7.1, 7.2, 7.3, 7.4, 7.5, 7.6, 7.7, 7.8, 7.9, 8, 8.5, 9, 9.5, 10, 11, 12, 13, 14, 15, 20, 25, 30, 35, or about 40 wt % or more of the cement activator composition. In a mixture including the cement activator composition and a cement composition including pumice, the one or more alkali sulfate salts can be any suitable percent of the total weight of pumice, such as about 0.001% to about 20%, or about 0.1% to about 5%, or about 0.001% or less, or less than, equal to, or more than about 0.01%, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.2, 2.4, 2.6, 2.8, 3, 3.2, 3.4, 3.6, 3.8, 4, 4.5, 5, 6, 7, 8, 9, 10, 12, 14, 16, 18%, or about 20% or more.

The cement activator composition can include a polyphosphate salt. The cement activator composition can include one polyphosphate salt or more than one polyphosphate salt. The polyphosphate salt can be any suitable polyphosphate salt, such that the cement activator composition can be used as described herein. For example, the polyphosphate salt can be a polymeric metaphosphate salt, a phosphate salt, or a combination thereof. The polyphosphate salt can be sodium hexametaphosphate, sodium trimetaphosphate, sodium tetrametaphosphate, sodium pentametaphosphate, sodium heptametaphosphate, sodium octametaphosphate, and combinations thereof. The polyphosphate salt can be sodium hexametaphosphate. The one or more polyphosphate salts can be any suitable proportion of the cement activator composition, such as about 0.001 wt % to about 30 wt % of the cement activator composition, about 1 wt % to about 15 wt %, or about 0.001 wt % or less, or less than, equal to, or greater than about 0.01 wt %, 0.1, 1, 1.5, 2, 2.5, 3, 3.5, 3.6, 3.8, 4, 4.1, 4.2, 4.3, 4.4, 4.5, 4.6, 4.7, 4.8, 4.9, 5, 5.2, 5.4, 5.6, 5.8, 6, 6.5, 7, 7.5, 8, 8.5, 9, 10, 11, 12, 13, 14, 15, 16, 18, 20, 22, 24, 26, 28, or about 30 wt % or more. In a mixture including the cement activator and a cement composition including pumice, the one or more polyphosphate salts can be any suitable percent of the weight of pumice therein, such as about 0.001% to about 20%, about 0.01% to about 10%, or about 0.001% or less, or less than, equal to, or greater than about 0.01%, 0.05%, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.2, 2.4, 2.6, 2.8, 3, 3.5, 4, 4.5, 5, 6, 7, 8, 9, 10, 12, 14, 16, 18, or about 20% or more.

The cement activator composition can include an optional dispersant; in some embodiments, the cement activator composition includes one or more dispersants, while in other embodiments, the cement activator composition can be free of dispersants. The dispersant can be any suitable dispersant such that the cement activator composition can be used as described herein. The dispersant can contribute to maintaining desirable slurry rheology when the cement composition is activated by the cement activator composition. The dispersant can influence thickening time of the cement slurry. The dispersant can be a superplasticizing dispersant, a sulfonated-formaldehyde-based dispersant (e.g., CFR-3™ available from Halliburton), a polycarboxylated ether dispersant, or a combination thereof. The dispersant can be a polycarboxylated ether, such as Liquiment® 514L or 5581F available from BASF. The one or more dispersants can form any suitable proportion of the cement activator composition, such as about 0.001 wt % to about 40 wt % of the cement activator composition, about 1 wt % to about 25 wt %, or about 0.001 wt % or less, or less than, equal to, or greater than about 0.01 wt %, 0.1, 1, 2, 4, 6, 7, 8, 8.5, 9, 9.5, 10, 10.2, 10.4, 10.6, 10.8, 11, 11.1, 11.2, 11.3, 11.4, 11.5, 11.6, 11.7, 11.8, 11.9, 12, 12.2, 12.4, 12.6, 12.8, 13, 13.5, 14, 14.5, 15, 16, 17, 18, 19, 20, 22, 24, 26, 28, 30, 35, or about 40 wt % or more of the cement activator composition. In a mixture including the cement activator and a cement composition including pumice, the one or more dispersants can be any suitable percent of the weight of pumice therein, such as about 0.001% to about 20%, about 0.01% to about 10%, or about 0.001% or less, or less than, equal to, or greater than about 0.01%, 0.05%, 0.1, 0.2, 0.3, 0.4, 0.5, 0.6, 0.7, 0.8, 0.9, 1, 1.2, 1.4, 1.5, 1.6, 1.7, 1.8, 1.9, 2, 2.1, 2.2, 2.3, 2.4, 2.5, 2.6, 2.7, 2.8, 2.9, 3, 3.2, 3.4, 3.6, 3.8, 4, 4.5, 5, 6, 7, 8, 9, 10, 12, 14, 16, 18, or about 20% or more.

The cement activator composition can include a stabilizer polymer. The cement activator composition can include one stabilizer polymer or more than one stabilizer polymer. The stabilizer polymer can include a repeating group that is an ethylene substituted with a group selected from the group consisting of —C(O)OH, a salt thereof, a substituted or unsubstituted $(C_1-C_{20})$hydrocarbyl ester thereof; —C(O)NR$^1_2$, wherein at each occurrence R$^1$ is independently selected from the group consisting of a substituted or unsubstituted $(C_1-C_{20})$hydrocarbyl; and —CN. At each occurrence the ethylene can be independently further substituted or unsubstituted. The stabilizer polymer can also include a repeating group that includes an anionic group. The one or more stabilizer polymer can form any suitable proportion of the cement activator composition, such that the cement activator composition can be used as described herein, such as about 0.001 wt % to about 30 wt % of the activator composition, about 0.1 wt % to about 10 wt %, or about 0.001 wt % or less, or less than, equal to, or greater than about 0.01 wt %, 0.1, 0.5, 1, 1.2, 1.4, 1.6, 1.8, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.2, 4.4, 4.6, 4.8, 5, 5.5, 6, 7, 8, 9, 10, 12, 14, 16, 18, 20, 25, or about 30 wt % or more. In a mixture including the cement activator and a cement composition including pumice, the one or more stabilizer polymers can be any suitable percent of the weight of pumice therein, such as about 0.001% to about 20%, about 0.01% to about 10%, about 0.1% to about 2.5%, or about 0.001% or less, or less than, equal to, or greater than about 0.01%, 0.05%, 0.1, 0.2, 0.3, 0.4, 0.5, 0.6, 0.7, 0.8, 0.9, 1, 1.2, 1.4, 1.5, 1.6, 1.7, 1.8, 1.9, 2, 2.1, 2.2, 2.3, 2.4, 2.5, 2.6, 2.7, 2.8, 2.9, 3, 3.2, 3.4, 3.6, 3.8, 4, 4.5, 5, 6, 7, 8, 9, 10, 12, 14, 16, 18, or about 20% or more.

Without being limited to any particular mechanism of action, in various embodiments, the combination of the alkali sulfate salt and the polyphosphate salt can create a synergy that provides better results than the singular use of either component. The alkali sulfated salt can provide alkali hydroxide upon reaction with lime, which can cause a rise in the pH of the slurry and consequently an increase in the rate of dissolution of silicon dioxide. Cement hydration rate can have a direct relationship with the proportion of free silicates and/or aluminosilicates. The polyphosphate salt can interact through a chelation mechanism that contributes to dissociation of retarding species from the surfaces of cementitious species, which can subsequently increase the rate of dissolution of inhibiting calcium complexes. However, without the presence of the stabilizer polymer described herein, the combination of the alkali sulfate salt and the polyphosphate salt cannot maintain homogeneity in the activator composition over long periods.

The repeating group that is a substituted ethylene can form any suitable proportion of the stabilizer polymer, such that the activator composition can be used as described herein, such as about 0.001 mol % to about 99.999 mol %, 0.001 mol % to about 25 mol %, or about 0.001 mol % or less, or less than, equal to, or greater than about 0.01 mol %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more of the stabilizer polymer. The repeating group that is a substituted ethylene can have the structure:

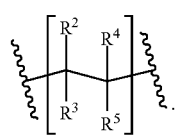

The variables R$^2$, R$^3$, and R$^4$ can be independently selected from the group consisting of —H, and substituted or unsubstituted $(C_1-C_{50})$hydrocarbyl interrupted by 0, 1, 2, or 3 groups independently selected from the group consisting of —O—, —S—, substituted or unsubstituted —NH—, —(CH$_2$—CH$_2$—O)$_{n1}$—, and —(CH$_2$—CH$_2$—CH$_2$—O)$_{n1}$—, wherein n1 is about 1 to about 10,000 (e.g., about 1 to about 1,000, about 1 to about 100, or about 1 to about 10, or about 2, 3, 4, 5, 6, 7, 8, 10, 15, 20, 25, 50, 75, 100, 150, 200, 250, 500, 750, 1,000, 2,000, 5,000, 7,500, or about 10,000 or more). The variables R$^2$, R$^3$, and R$^4$ can be independently unsubstituted $(C_1-C_{20})$hydrocarbyl. The variables R$^2$, R$^3$, and R$^4$ can be independently $(C_1-C_{10})$alkyl. The variables R$^2$, R$^3$, and R$^4$ can be —H. The variable R$^5$ can be independently selected from the group consisting of —C(O)OH, a salt thereof, a substituted or unsubstituted $(C_1-C_{20})$hydrocarbyl ester thereof; —C(O)NR$^1_2$, wherein at each occurrence R$^1$ is independently selected from the group consisting of a substituted or unsubstituted $(C_1-C_{20})$hydrocarbyl; and —CN. The variable R$^5$ can be —C(O)NR$^1_2$, wherein at each occurrence R$^1$ can be independently unsubstituted $(C_1-C_{20})$hydrocarbyl. The variable R$^5$ can be —C(O)NR$^1_2$, wherein at each occurrence R$^1$ can be $(C_1-C_5)$alkyl. The variable R$^5$ can be —C(O)NR$^1_2$, wherein R$^1$ can be methyl. The repeating group that is a substituted ethylene can have the structure:

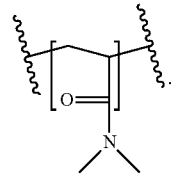

The repeating group that includes an anionic group can form any suitable proportion of the stabilizer polymer, such that the activator composition can be used as described herein, such as about 0.001 mol % to about 99.999 mol % of the stabilizer polymer, about 25 mol % to about 99.999 mol %, or about 0.001 mol % or less, or less than, equal to, or greater than about 0.01 mol %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more of the stabilizer polymer. The anionic group in the repeating group can be in the form of an acid or a salt thereof. The repeating group that includes an anionic group can have the structure:

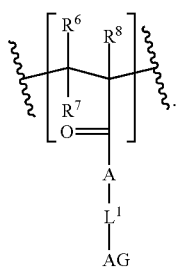

The variable A can be selected from the group consisting of —O— and —NR$^9$—. The variable A can be —NR$^9$—. The variable R$^9$ can be selected from the group consisting of —H and $(C_1-C_{10})$alkyl. The variable A can be —NH—. The variables $R^6$, $R^7$, $R^8$, $R^9$ can be independently selected from the group consisting of —H, and a substituted or unsubstituted $(C_1\text{-}C_{50})$hydrocarbyl interrupted by 0, 1, 2, or 3 groups independently selected from the group consisting of —O—, —S—, substituted or unsubstituted —NH—, —(CH$_2$—CH$_2$—O)$_{n2}$—, and —(CH$_2$—CH$_2$—CH$_2$—O)$_{n2}$—, wherein n2 is about 1 to about 10,000 (e.g., about 1 to about 1,000, about 1 to about 100, or about 1 to about 10, or about 2, 3, 4, 5, 6, 7, 8, 10, 15, 20, 25, 50, 75, 100, 150, 200, 250, 500, 750, 1,000, 2,000, 5,000, 7,500, or about 10,000 or more). The variables $R^6$, $R^7$, $R^8$ can be independently selected from the group consisting of —H and unsubstituted $(C_1\text{-}C_{20})$hydrocarbyl. The variables $R^6$, $R^7$, $R^8$ can be independently selected from the group consisting of —H and unsubstituted $(C_1\text{-}C_{10})$alkyl. The variables $R^6$, $R^7$, $R^8$ can be —H. The variable $L^1$ is selected from the group consisting of a bond and a substituted or unsubstituted $(C_1\text{-}C_{50})$hydrocarbylene interrupted by 0, 1, 2, or 3 groups independently selected from the group consisting of —O—, —S—, substituted or unsubstituted —NH—, —(CH$_2$—CH$_2$—O)$_{n3}$—, and —(CH$_2$—CH$_2$—CH$_2$—O)$_{n3}$—, wherein n3 is about 1 to about 10,000 (e.g., about 1 to about 1,000, about 1 to about 100, or about 1 to about 10, or about 2, 3, 4, 5, 6, 7, 8, 10, 15, 20, 25, 50, 75, 100, 150, 200, 250, 500, 750, 1,000, 2,000, 5,000, 7,500, or about 10,000 or more). The variable $L^1$ can be a $(C_1\text{-}C_{20})$hydrocarbylene that is unsubstituted or substituted with a $(C_1\text{-}C_{10})$alkyl and otherwise unsubstituted. The variable $L^1$ can be a $(C_1\text{-}C_{20})$alkylene that is unsubstituted or substituted with a $(C_1\text{-}C_5)$alkyl and otherwise unsubstituted. The variable $L^1$ can be a $(C_1\text{-}C_{10})$alkylene that is unsubstituted or substituted with a methyl and otherwise unsubstituted. The variable $L^1$ can be a 2-methyl substituted prop-1,2-ylene. The variable $L^1$ can have the structure:

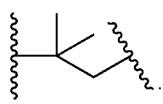

The variable AG can be the anionic group. The variable AG can be —S(O)(O)—OH or a salt thereof. The repeating group that includes an anionic group can have the structure:

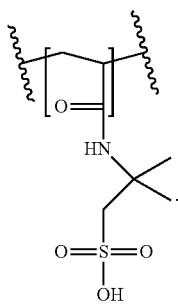

The —S(O)(O)OH can be in the form of an acid or a salt thereof.

In various embodiments, the stabilizer polymer can include repeating groups having the structure:

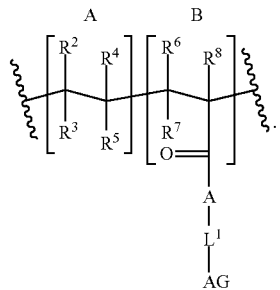

At each occurrence, the repeating units can independently occur in the direction shown or in the opposite direction. The repeating units can have a block or random copolymer arrangement. The variables $R^2$, $R^3$, and $R^4$ can be independently selected from the group consisting of —H, and substituted or unsubstituted $(C_1\text{-}C_{50})$hydrocarbyl interrupted by 0, 1, 2, or 3 groups independently selected from the group consisting of —O—, —S—, substituted or unsubstituted —NH—, —(CH$_2$—CH$_2$—O)$_{n1}$—, and —(CH$_2$—CH$_2$—O)$_{n1}$—, wherein n1 is about 1 to about 10,000. The variable $R^5$ can be independently selected from the group consisting of —C(O)OH, a salt thereof, a substituted or unsubstituted $(C_1\text{-}C_{20})$hydrocarbyl ester thereof; —C(O)NR$^1{}_2$, wherein at each occurrence $R^1$ is independently selected from the group consisting of a substituted or unsubstituted $(C_1\text{-}C_{20})$hydrocarbyl; and —CN. The variable A can be selected from the group consisting of —O— and —NR$^9$—. The variables $R^6$, $R^7$, $R^8$, $R^9$ can be independently selected from the group consisting of —H, and a substituted or unsubstituted $(C_1\text{-}C_{50})$hydrocarbyl interrupted by 0, 1, 2, or 3 groups independently selected from the group consisting of —O—, —S—, substituted or unsubstituted —NH—, —(CH$_2$—CH$_2$—O)$_{n2}$—, and —(CH$_2$—CH$_2$—CH$_2$—O)$_{n2}$—, wherein n2 is about 1 to about 10,000. The variable $L^1$ can be selected from the group consisting of a bond and a substituted or unsubstituted $(C_1\text{-}C_{50})$hydrocarbylene interrupted by 0, 1, 2, or 3 groups independently selected from the group consisting of —O—, —S—, substituted or unsubstituted —NH—, —(CH$_2$—CH$_2$—O)$_{n3}$—, and —(CH$_2$—CH$_2$—CH$_2$—O)$_{n3}$—, wherein n3 is about 1 to about 10,000. The variable AG can be the anionic group. Repeating group A can be about 0.001 mol % to about 99.999 mol % of the stabilizer polymer. Repeating group B can be about 0.001 mol % to about 99.999 mol % of the stabilizer polymer. In various embodiments, repeating groups A and B together form about 100 mol % of the stabilizer polymer.

In various embodiments, the stabilizer polymer can include repeating groups having the structure:

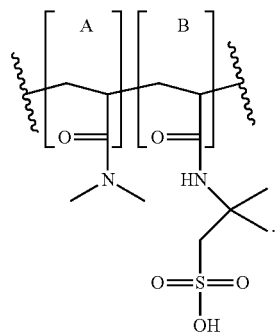

The —S(O)(O)OH group can be in the form of an acid or a salt thereof. Repeating group A can be about 0.001 mol % to about 99.999 mol % of the stabilizer polymer. Repeating group B can be about 0.001 mol % to about 99.999 mol % of the stabilizer polymer.

In various embodiments, the stabilizer polymer can further include a repeating unit formed from a vinyl-substituted nitrogen-containing ($C_1$-$C_{20}$)heterocycle. The repeating unit formed from a vinyl-substituted nitrogen-containing ($C_1$-$C_{20}$)heterocycle can be about 0.001 mol % to about 99.999 mol % of the stabilizer polymer, about 5 mol % to about 50 mol %, or about 0.001 mol % or less, or less than, equal to, or greater than about 0.01 mol %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more of the stabilizer polymer. The vinyl group of the vinyl-substituted nitrogen-containing ($C_1$-$C_{20}$)heterocycle can be substituted on a nitrogen atom of the nitrogen-containing ($C_1$-$C_{20}$)heterocycle. The vinyl-substituted nitrogen-containing ($C_1$-$C_{20}$) heterocycle can be N-vinylpyrrolidone.

The stabilizer polymer can further include an acrylic acid repeating unit (e.g., a repeating unit that can be formed from polymerized acrylic acid, or formed from a polymerized material that is subsequently hydrolyzed to acrylic acid such as an acrylic acid ester or acrylamide). The acrylic acid repeating unit can be about 0.001 mol % to about 99.999 mol % of the stabilizer polymer, about 0.001 mol % to about 5 mol %, or about 0.001 mol % or less, or less than, equal to, or greater than about 0.01 mol %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more of the stabilizer polymer.

In some embodiments, the repeating group that is a substituted ethylene is an acrylamide repeating unit, wherein the repeating group that includes an anionic group is a 2-acrylamido-2-methylpropane sulfonic acid or salt thereof repeating unit, wherein the stabilizer polymer further includes an acrylic acid repeating unit and a N-vinylpyrrolidone repeating unit. In some embodiments, the acrylamide repeating unit, the AMPS repeating unit, the acrylic acid repeating unit, and the N-vinylpyrrolidone repeating unit can form about 100 mol % of the stabilizer polymer.

In some embodiments, the stabilizer polymer further includes an acrylonitrile repeating unit. The acrylonitrile repeating unit can be about 0.001 mol % to about 99.999 mol % of the stabilizer polymer, 0.001 mol % to about 10 mol %, or about 0.001 mol % or less, or less than, equal to, or greater than about 0.01 mol %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more of the stabilizer polymer.

In some embodiments, the repeating group that is a substituted ethylene is an acrylamide repeating unit, wherein the repeating group that includes an anionic group is a 2-acrylamido-2-methylpropane sulfonic acid repeating unit or salt thereof, and the stabilizer polymer further includes an acrylonitrile repeating group. In some embodiments, the acrylamide repeating unit, the AMPS repeating unit, and the acrylonitrile repeating unit, can form about 100 mol % of the stabilizer polymer.

Other Components.

The cement activator composition, the cement composition, or a mixture including one or both of the same, can include any suitable additional component in any suitable proportion, such that the cement activator composition or the mixture of cement activator composition and cement composition can be used as described herein. Any component listed in this section can be present or not present in the cement activator composition, the cement composition, or a mixture including one or both of the same.

In some embodiments, the cement activator composition, the cement composition, or a mixture including one or both of the same, includes one or more viscosifiers. The viscosifier can be any suitable viscosifier. The viscosifier can affect the viscosity of the cement activator composition, the cement composition, or a mixture including one or both of the same, at any suitable time and location. In some embodiments, the viscosifier provides an increased viscosity at least one of: before injection into the subterranean formation; at the time of injection into the subterranean formation; during travel through a tubular disposed in a borehole; once the cement activator composition, the cement composition, or a mixture including one or both of the same, reaches a particular subterranean location; or some period of time after the composition or mixture reaches a particular subterranean location. In some embodiments, the viscosifier can be about 0.000,1 wt % to about 10 wt % of the cement activator composition, the cement composition, or a mixture including one or both of the same, about 0.004 wt % to about 0.01 wt %, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, karaya gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen-containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the cement activator composition, the cement composition, or a mixture including one or both of the same, can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$)alkyl ether (e.g., pentaerythritol allyl ether), and a poly($C_2$-$C_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the cement activator composition, the cement composition, or a mixture including one or both of the same, about 0.001 wt % to about 0.01 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or about 5 wt % or more.

The cement activator composition, the cement composition, or a mixture including one or both of the same, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the cement activator composition, the cement composition, or a mixture including one or both of the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The cement activator composition, the cement composition, or a mixture including one or both of the same can include any suitable downhole fluid. The cement activator composition can be combined with any suitable downhole fluid before, during, or after the placement of the composition in the subterranean formation or the contacting of the composition and the subterranean material. In some examples, the cement activator composition is combined with a downhole fluid above the surface, and then the combined composition is placed in a subterranean formation or contacted with a subterranean material. In another example, the cement activator composition is injected into a subterranean formation to combine with a downhole fluid, and the combined composition is contacted with a subterranean material or is considered to be placed in the subterranean formation. The placement of the cement activator composition in the subterranean formation can include contacting the subterranean material and the mixture including the cement activator composition. Any suitable weight percent of the cement activator composition, the cement composition, or a mixture including one or both of the same, that is placed in the subterranean formation or contacted with the subterranean material, can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the cement activator composition, the cement composition, or a mixture including one or both of the same.

In some embodiments, the cement activator composition, the cement composition, or a mixture including one or both of the same, can include any suitable amount of any suitable material used in a downhole fluid. For example, the cement activator composition, the cement composition, or a mixture including one or both of the same, can include a cement set activator, such as: a zeolite; an amine such as triethanolamine or diethanolamine; a silicate such as sodium silicate; zinc formate; calcium acetate; a Group IA or IIA hydroxide such as sodium hydroxide, magnesium hydroxide, or calcium hydroxide; a monovalent salt such as sodium chloride; a divalent salt such as calcium chloride; nanosilica (e.g., silica having a particle size of less than or equal to about 100 nanometers); a polyphosphate; and combinations thereof). The cement activator composition, the cement composition, or a mixture including one or both of the same can include calcium chloride, triethanolamine, sodium silicate, zinc formate, calcium acetate, sodium hydroxide, water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. Any suitable proportion of the cement activator composition, the cement composition, or a mixture including one or both of the same, can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the cement activator composition, the cement composition, or a mixture including one or both of the same.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a cement activator composition, such as any embodiment of the cement activator composition described herein. The system can also include a subterranean formation including the cement activator composition therein. In some embodiments, the cement activator composition in the system can also include a downhole fluid, or the system can include a mixture of the cement activator composition and downhole fluid. In some embodiments, the system can include a tubular, and a pump configured to pump the composition into the subterranean formation through the tubular. In various embodiments, the system includes a mixture that includes the cement activator composition and a cement composition.

Various embodiments provide systems and apparatus configured for delivering the composition described herein to a subterranean location and for using the composition therein, such as for a cementing operation. In various embodiments, the system or apparatus can include a pump fluidly coupled to a tubular (e.g., any suitable type of oilfield pipe, such as pipeline, drill pipe, production tubing, and the like), with the tubular including the cement activator composition or a mixture including the same described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. In some embodiments, the high pressure pump can be capable of fluidly conveying particulate matter into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the cement activator composition to the high pressure pump. In such embodiments, the low pressure pump can "step up" the pressure of the cement activator composition before it reaches the high pressure pump.

In some embodiments, the systems or apparatuses described herein can further include a mixing tank that is upstream of the pump and in which the cement activator composition is formulated or mixed with other materials (e.g., with a cement composition or with other additives). In various embodiments, the pump (e.g., a low pressure pump, a high pressure pump, or a combination thereof) can convey the cement activator composition or a mixture including the same from the mixing tank or other source of the cement activator composition to the tubular. In other embodiments, however, the cement activator composition can be formulated offsite and transported to a worksite, in which case the cement activator composition or mixture including the same can be introduced to the tubular via the pump directly from its shipping container (e.g., a truck, a railcar, a barge, or the like) or from a transport pipeline. In either case, the cement activator composition or mixture including the same can be drawn into the pump, elevated to an appropriate pressure, and then introduced into the tubular for delivery to the subterranean formation.

FIG. 1 shows an illustrative schematic of systems and apparatuses that can deliver embodiments of the cement activator composition or mixture including the same to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the cement activator composition or mixture including the same can be formulated. The cement activator composition or mixture including the same can be conveyed via line 12 to wellhead 14, where the composition or mixture including the same enters tubular 16, with tubular 16 extending from wellhead 14 into subterranean formation 18. Upon being ejected from tubular 16, the composition or mixture including the same can subsequently penetrate into subterranean formation 18. Pump 20 can be configured to raise the pressure of the composition or mixture including the same to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like. Although not depicted in FIG. 1, at least part of the composition can, in some embodiments, flow back to wellhead 14.

It is also to be recognized that the disclosed cement activator composition or mixture including the same can also directly or indirectly affect the various downhole or subterranean equipment and tools that can come into contact with the composition or mixture including the same during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

Composition for Treatment of a Subterranean Formation.

Various embodiments provide a liquid cement activator composition for treatment of a subterranean formation. The cement activator composition can be any suitable composition that can be used to perform an embodiment of the method for treatment of a subterranean formation described herein.

For example, the liquid cement activator composition can include water, an alkali sulfate salt, a polyphosphate salt, and a stabilizer polymer. The stabilizer polymer can include a repeating group that is an ethylene substituted with a group selected from the group consisting of —C(O)OH, a salt thereof, a substituted or unsubstituted $(C_1-C_{20})$hydrocarbyl ester thereof; —C(O)NR$^1_2$, wherein at each occurrence R$^1$ is independently selected from the group consisting of a substituted or unsubstituted $(C_1-C_{20})$hydrocarbyl; and —CN. At each occurrence the ethylene is independently further substituted or unsubstituted. The stabilizer polymer can also include a repeating group that includes an anionic group.

In various embodiments, the liquid cement activator composition includes water, an alkali sulfate salt, a polyphosphate salt, and a stabilizer polymer. The water can be about 30 wt % to about 95 wt % of the liquid cement activator composition. The alkali sulfate salt can be about 0.001 wt % to about 40 wt % of the liquid cement activator composition. The polyphosphate salt can be about 0.001 wt % to about 30 wt % of the liquid cement activator composition. The stabilizer polymer can be about 0.001 wt % to about 30 wt % of the liquid cement activator composition. The stabilizer polymer can include repeating groups having the structure:

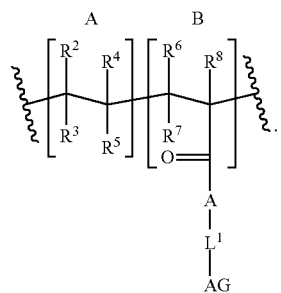

At each occurrence, the repeating units independently occur in the direction shown or in the opposite direction. The repeating units can have a block or random copolymer arrangement. The variables $R^2$, $R^3$, and $R^4$ can be independently selected from the group consisting of —H, and substituted or unsubstituted $(C_1-C_{50})$hydrocarbyl interrupted by 0, 1, 2, or 3 groups independently selected from the group consisting of —O—, —S—, substituted or unsubstituted —NH—, —$(CH_2—CH_2—O)_{n1}$—, and —$(CH_2—CH_2—CH_2—O)_{n1}$—, wherein n1 is about 1 to about 10,000. The variable $R^5$ can be independently selected from the group consisting of —C(O)OH, a salt thereof, a substituted or unsubstituted $(C_1-C_{20})$hydrocarbyl ester thereof; —C(O)NR$^1_2$, wherein at each occurrence $R^1$ is independently selected from the group consisting of a substituted or unsubstituted $(C_1-C_{20})$hydrocarbyl; and —CN. The variable A can be selected from the group consisting of —O— and —NR$^9$—. The variables $R^6$, $R^7$, $R^8$, $R^9$ can be independently selected from the group consisting of —H, and a substituted or unsubstituted $(C_1-C_{50})$hydrocarbyl interrupted by 0, 1, 2, or 3 groups independently selected from the group consisting of —O—, —S—, substituted or unsubstituted —NH—, —$(CH_2—CH_2—O)_{n2}$—, and —$(CH_2—CH_2—CH_2—O)_{n2}$—, wherein n2 is about 1 to about 10,000. The variable $L^1$ can be selected from the group consisting of a bond and a substituted or unsubstituted $(C_1-C_{50})$hydrocarbylene interrupted by 0, 1, 2, or 3 groups independently selected from the group consisting of —O—, —S—, substituted or unsubstituted —NH—, —$(CH_2—CH_2—O)_{n3}$—, and —$(CH_2—CH_2—CH_2—O)_{n3}$—, wherein n3 is about 1 to about 10,000. The variable AG can be the anionic group. Repeating group A can be about 0.001 mol % to about 99.999 mol % of the stabilizer polymer. Repeating group B can be about 0.001 mol % to about 99.999 mol % of the stabilizer polymer.

In some embodiments, the present invention provides a mixture that includes an embodiment of the cement activator composition and an embodiment of the cement composition described herein, such as a pumice-containing cement composition (e.g., a pozzolana cement-containing cement composition). In various embodiments, the present invention provides a cured produce of the mixture including the cement activator composition and the cement composition. Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a liquid cement activator composition for treatment of a subterranean formation, such as any embodiment of a cement activator composition described herein. The liquid cement activator composition can include water, an alkali sulfate salt, a polyphosphate salt, and a stabilizer polymer. The stabilizer polymer can be any embodiment of a stabilizer polymer described herein. The stabilizer polymer can include a repeating group that is an ethylene substituted with a group selected from the group consisting of —C(O)OH, a salt thereof, a substituted or unsubstituted $(C_1-C_{20})$hydrocarbyl ester thereof; —C(O)NR$^1_2$, wherein at each occurrence $R^1$ is independently selected from the group consisting of a substituted or unsubstituted $(C_1-C_{20})$hydrocarbyl; and —CN. At each occurrence the ethylene is independently further substituted or unsubstituted. The stabilizer polymer can also include a repeating group that includes an anionic group.

EXAMPLES

Various embodiments of the present invention can be better understood by reference to the following Examples which are offered by way of illustration. The present invention is not limited to the Examples given herein.

General. Liquiment® 5581F is a polycarboxylated ether dispersant, available from BASF Corporation. SA-1015™ suspending agent is an additive available from Halliburton Corporation. Halad®-344 is a copolymer derived from acrylamido-methyl-propane sulfonate (AMPS) and dimethylacrylamide (DMA), available from Halliburton Corporation. Halad®-200 is a copolymer derived from acrylamido-methyl-propane sulfonate (AMPS), dimethylacrylamide (DMA), N-vinyl pyrrolidone, and acrylic acid, available from Halliburton Corporation. Halad®-413 is a copolymer derived from acrylamide, acrylonitrile, and 2-acrylamido-2-methylpropane sulfonic acid (AMPS), with the AMPS groups grafted on lignite, available from Halliburton Corporation. LAP-1 is poly(vinyl alcohol), available from Halliburton Corporation. HZ30™ is polyacrylamide that may partially hydrolyze upon storage or upon contact with aqueous media, available from Halliburton Corporation. The designation of wt % bwP refers to the percent by weight of pozzolan in an 800 g liquid slurry sample of a pumice cement (434.82 g, 54.35 wt %). The pozzolan was the only pumice present in the liquid slurry sample of the pumice cement.

Example 1

Sample A. Activating System without an AMPS/DMA Copolymer (Comparative)

The activator system was mixed in the order and concentrations shown in Table 1. Activator was mixed in an American Petroleum Institute (API) blender in approximately 240 g of $H_2O$, at approximately 1300-1500 rpm.

TABLE 1

| Order of addition | Material | Mass | Wt % bwP |
|---|---|---|---|
| 1 | sodium hexametaphosphate (SHMP) | 18 g | 0.9% |
| 2 | $Na_2SO_4$ | 27 g | 1.35% |
| 3 | Liquiment ® 5581F | 42 g | 2.1% |

Figure 2:
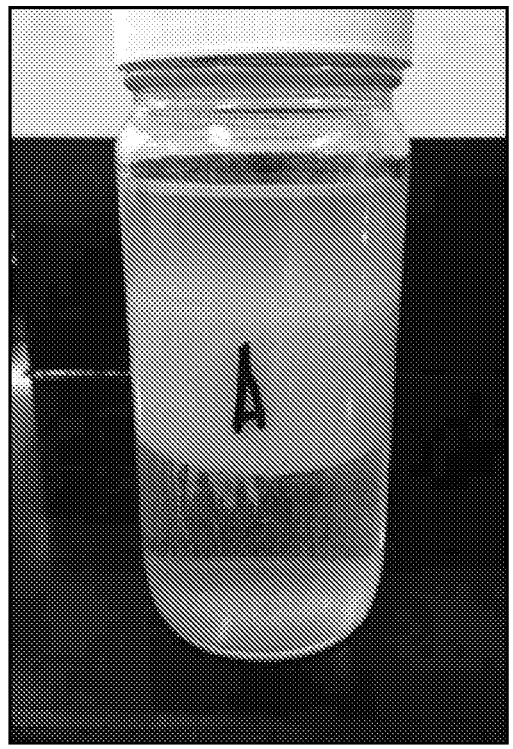
FIG. 2 illustrates a photograph of a 7-day-old activating system, in accordance with various embodiments.

Immediate separation after mixing occurred. The top layer appeared after the solution was allowed to sit for approximately 24 hrs. Appearance of the cloudy, yellow top layer seemed to be dependent upon the amount of time that the solution was allowed to sit undisturbed. The second layer of the solution was very difficult to re-homogenize when agitated. FIG. 2 illustrates a photograph of the activator system after 7 days Example 2

Sample B. Activating System with an AMPS/DMA Copolymer

The activator system was mixed in the order and concentrations shown in Table 2. The activator was mixed in an API blender in approximately 240 g of $H_2O$, at approximately 1300-1500 rpm.

TABLE 2

| Order of addition | Material | Mass | Wt % bwP |
|---|---|---|---|
| 1 | SHMP | 18 g | 0.9% |
| 2 | Na$_2$SO$_4$ | 27 g | 1.35% |
| 3 | Liquiment ® 5581F | 42 g | 2.1% |
| 4 | Halad ®-344 | 10 g | 0.5% |

Figure 3:
FIG. 3 illustrates a photograph of a 7-day-old activating system including a 2-acrylamido-2-methylpropane sulfonic acid (AMPS)/dimethylacrylamide (DMA) copolymer, in accordance with various embodiments.

The sample remained homogenous from time mixing stopped to the 7-day mark at which this picture was taken. Brookfield viscosity measurements indicated a stable slurry at around 400 cP. FIG. 3 illustrates a photograph of the activating system after 7 days.

Example 3

Sample C. Activating System with AMPS/Acrylamide/Acrylonitrile Copolymer and a Viscosifier The activator system was mixed in the order and concentrations shown in Table 3. The activator was mixed an in API blender in approximately 240 g of H$_2$O, at approximately 1300-1500 rpm.

TABLE 3

| Order of addition | Material | Mass | Wt % bwP |
|---|---|---|---|
| 1 | SHMP | 18 g | 0.9% |
| 2 | Na$_2$SO$_4$ | 27 g | 1.35% |
| 3 | Liquiment ® 5581F | 42 g | 2.1% |
| 4 | Halad ®-413 | 10 g | 0.5% |

Figure 4:
FIG. 4 illustrates a photograph of a 3-day-old activating system including an AMPS/acrylamide/acrylonitrile copolymer and a viscosifier, in accordance with various embodiments.

The sample showed signs of separation 15-20 mins after mixing as indicated by the darker layer in the bottom of the picture. Clear separation between top and bottom layers was visible after 3 days. FIG. 4 illustrates a photograph of the activating system after 3 days. The dark bottom-most layer indicates the beginning of a darker layer forming from the much larger, brighter top layer.

Example 4

Sample D. Activating System with an AMPS/DMA Copolymer and a Viscosifier

The activator system was mixed in the order and concentrations shown in Table 4. The activator was mixed in an API blender in approximately 240 g of H$_2$O, at approximately 1300-1500 rpm.

TABLE 4

| Order of addition | Material | Mass | Wt % bwP |
|---|---|---|---|
| 1 | SA-1015 ™ suspending agent | 2 g | 0.1% |
| 2 | SHMP | 18 g | 0.9% |
| 3 | Na$_2$SO$_4$ | 27 g | 1.35% |
| 4 | Liquiment ® 5581F | 42 g | 2.1% |

Figure 5:
FIG. 5 illustrates a photograph of a 3-day-old activating system including an AMPS/DMA copolymer and viscosifier, in accordance with various embodiments.

SA1015™ suspending agent was added initially and mixed for 2-3 minutes until yielding completely and producing a thick gel. Addition of Liquiment® 5581F significantly thickened the solution during mixing. Additional shear (2000 rpm) was used to reintroduce a vortex during mixing. The mixture begin to slowly separate after mixing. After 3 days, the top cloudy layer appeared, and the middle layer was becoming distinct from the clear bottom layer. The second layer of the solution was very difficult to re-homogenize when agitated. FIG. 5 illustrates a photograph of the activating system after 3 days.

Example 5

Sample E. Activating System with an AMPS/DMA Copolymer and a Viscosifier

The activator system was mixed in the order and concentrations shown in Table 5. The activator was mixed in an API blender in approximately 240 g of H$_2$O, at approximately 1300-1500 rpm.

TABLE 5

| Order of addition | Material | Mass | Wt % bwP |
|---|---|---|---|
| 1 | SHMP | 18 g | 0.9% |
| 2 | Na$_2$SO$_4$ | 27 g | 1.35% |
| 3 | Liquiment ® 5581F | 42 g | 2.1% |
| 4 | SA-1015 ™ suspending agent | 2 g | 0.1% |

Figure 6:
FIG. 6 illustrates a photograph of a 4-day-old activating system including an AMPS/DMA copolymer and a viscosifier, in accordance with various embodiments.

The system begin to slowly separate after mixing. The sample showed a third, top layer at around 24 hours after initial mixing. When compared to the previous activator (Sample D) of the exact same formulation and order of addition, much more distinct separation is visible that is created as a result of time. The second layer of the solution was very difficult to re-homogenize when agitated. FIG. 6 illustrates a photograph of the activating system after 4 days.

Example 6

Sample F. Activating System with an AMPS/DMA Copolymer and a Viscosifier

The activator system was mixed in the order and concentrations shown in Table 6. The activator was mixed an in API blender in approximately 240 g of H$_2$O, at approximately 1300-1500 rpm.

TABLE 6

| Order of addition | Material | Mass | Wt % |
|---|---|---|---|
| 1 | SA-1015 ™ suspending agent | 0.24 g | 0.1% by weight of water (BWOW) |
| 2 | SHMP | 18 g | 0.9% bwP |
| 3 | Na$_2$SO$_4$ | 27 g | 1.35% bwP |
| 4 | Liquiment ® 5581F | 42 g | 2.1% bwP |

Figure 7:
FIG. 7 illustrates a photograph of a 3-day-old activating system including an AMPS/DMA copolymer and a viscosifier, in accordance with various embodiments.

The sample separated immediately after mixing. Sample was showing top layer of foam 1-3 hours after mixing. Less SA1015™ suspending agent seems to expedite the separation process, as well as create another layer on the top of the solution. The second layer of the solution was very difficult to re-homogenize when agitated. FIG. 7 illustrates a photograph of the activating system after 3 days. The fourth layer at the top of the solution was not present in other samples.

Example 7

Sample G. Activating System without an AMPS/DMA Copolymer (Comparative)

The activator system was mixed in the order and concentrations shown in Table 7. The activator was mixed an in API blender in approximately 240 g of H$_2$O, at approximately 1300-1500 rpm.

TABLE 7

| Order of addition | Material | Mass | Wt % bwP |
|---|---|---|---|
| 1 | Liquiment ® 5581F | 42 g | 2.1% |
| 2 | SHMP | 18 g | 0.9% |
| 3 | Na$_2$SO$_4$ | 27 g | 1.35% |

Figure 8:
FIG. 8 illustrates a photograph of a 3-day-old activating system, in accordance with various embodiments.

The sample separated immediately upon completion of mixing. A small third layer of foam appeared at the top of the solution. The second layer of the solution was very difficult to re-homogenize when agitated. FIG. 8 illustrates a photograph of the activating system after 3 days.

Example 8

Sample H. Activating System without an AMPS/DMA Copolymer (Comparative)

The activator system was mixed in the order and concentrations shown in Table 8. The activator was mixed an in API blender in approximately 240 g of H$_2$O, at approximately 1300-1500 rpm.

TABLE 8

| Order of addition | Material | Mass | Wt % bwP |
|---|---|---|---|
| 1 | Liquiment ® 5581F | 42 g | 2.1% |
| 2 | Na$_2$SO$_4$ | 27 g | 1.35% |
| 3 | SHMP | 18 g | 0.9% |

Figure 9:
FIG. 9 illustrates a photograph of a 3-day-old activating system, in accordance with various embodiments.

The sample was extremely thick upon completion of mixing. The sample separated slowly, with a large portion of the solution occupied by Liquiment® 5581F. Small amounts of Liquiment® 5581F remained in the bottom layer. This was not seen in any of the previous samples. The second layer of the solution was very difficult to re-homogenize when agitated. FIG. 9 illustrates a photograph of the activating system after 3 days. Small amounts of Liquiment® 5581F were visible in the bottom layer.

Example 9

Sample I. Activating System with an AMPS/Acrylamide/N-Vinylpyrrolidone/Acrylic Acid Copolymer The activator system was mixed in the order and concentrations shown in Table 9. The activator was mixed an in API blender in approximately 240 g of H$_2$O, at approximately 1300-1500 rpm.

TABLE 9

| Order of addition | Material | Mass | Wt % bwP |
|---|---|---|---|
| 1 | SHMP | 18 g | 0.9% |
| 2 | Na$_2$SO$_4$ | 27 g | 1.35% |
| 3 | Liquiment ® 5581F | 42 g | 2.1% |
| 4 | Halad ®-200 | 10 g | 0.5% |

Figure 10:
FIG. 10 illustrates a photograph of a 24-hour-old activating system including an AMPS/DMA copolymer, in accordance with various embodiments.

The sample remained homogenous from the time mixing stopped to at least the 48 hour mark. FIG. 10 illustrates a photograph of the activating system after 24 hours.

Example 10

Sample J. Activating System with a Poly(Vinyl Alcohol) Polymer (Comparative)

The activator system was mixed in the order and concentrations shown in Table 10. The activator was mixed an in API blender in approximately 240 g of H$_2$O, at approximately 1300-1500 rpm.

TABLE 10

| Order of addition | Material | Mass | Wt % bwP |
|---|---|---|---|
| 1 | SHMP | 18 g | 0.9% |
| 2 | Na$_2$SO$_4$ | 27 g | 1.35% |
| 3 | Liquiment ® 5581F | 42 g | 2.1% |
| 4 | LAP-1 | 10 g | 0.5% |

Figure 11:
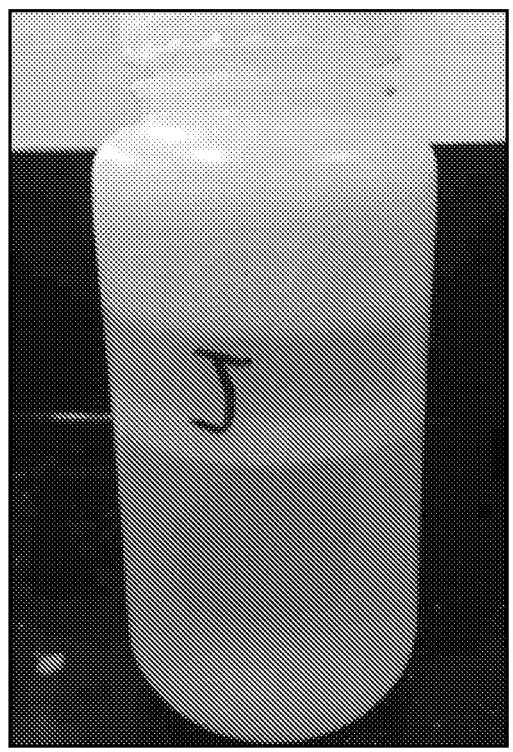
FIG. 11 illustrates a photograph of a 24-hour-old activating system including a poly(vinyl alcohol) polymer, in accordance with various embodiments.

The sample separated immediately. The sample separated into 4 distinct layers by the 24 hour mark. FIG. 11 illustrates a photograph of the activating system after 24 hours.

Example 11

Sample K. Activating System with an Acrylamide-Acrylic Acid Copolymer (Comparative)

The activator system was mixed according to standard procedure, in the order and concentrations shown in Table 11. The activator was mixed an in API blender with 200 g of water to account for the 40 g of water present in the HZ-30 solution (activity of HZ-30 was 20%; therefore, 50 g of HZ-30 solution was needed to place 10 g of HZ-30 polymer in the activator). HZ-30 solution was added to the water before mixing began. Blender speed was approximately 1300-1500 rpm.

TABLE 11

| Order of addition | Material | Mass | Wt % bwP |
|---|---|---|---|
| 1 | HZ-30 + H$_2$O | 10 g HZ-30 + 40 g H$_2$O | 0.5% |
| 2 | SHMP | 18 g | 0.9% |
| 3 | Na$_2$SO$_4$ | 27 g | 1.35% |
| 4 | Liquiment ® 5581F | 42 g | 2.1% |

Figure 12:
FIG. 12 illustrates a photograph of a 24-hour-old activating system including an acrylamide-acrylic acid copolymer, in accordance with various embodiments.

The sample separated immediately. The sample separated into 4 distinct layers by the 24 hour mark. FIG. 12 illustrates a photograph of the activating system, after 24 hours.

Example 12

Analysis of Examples 1-11

Example A is a conventional sodium sulfate and sodium hexametaphosphate activating system with polycarboxylate ether dispersant Liquiment® 5581F (BASF). As can be observed from the image in FIG. 2, this system immediately separates into distinct phases or layers and does not retain homogeneity. Furthermore, it is difficult to homogenize with agitation after the separating. To determine whether the order of addition of the ingredients influenced the system homogeneity, Examples G and H were prepared. Even though Examples G and H were prepared by adding the ingredients in different sequences, separation was still observed. Separation in Example H was slower, but still within 1-2 hours from preparation.

Example B is the same formula of sodium sulfate, sodium hexametaphosphate, and Liquiment® 5581F as described for Example A, but has 0.5% by weight of pumice (bwP) Halad®-344 (copolymer of AMPS and dimethyl acrylamide) added to it. As shown in FIG. 3, the resulting suspension remained homogenous without exhibiting phase separation for 7 days. Both Examples A and B were prepared in the same manner. Rheology measurements were performed on Examples A and B with a LV Series Brookfield Viscometer using a #2 spindle at 60 rpms. The average viscosity of several runs for each was 114 cP for Example A and 399 cP for Example B. This result prompted the consideration that a viscosity increase, provided by the addition of co-polymer, may be responsible for improving the suspension, homogeneity, and overall stability of the activator system.

To investigate the influence of viscosity on the activator system stability, Examples D, E, and F were prepared. These examples contained of SA1015™ suspending agent as a viscosifier. If the stabilizing effect was derived from an increase in system viscosity that enabled greater uniformity and homogeneity, addition of the suspension aid should also provide stabilization. It was found that regardless of (1) the concentration of suspension aid or (2) the sequence of addition of the suspension aid separation could not be suppressed. The rate of separation for each example ranged from days (3 days, D) to hours (within 24 hours, E) to minutes (immediate separation, F). None of the Examples D, E, or F remained homogenous with addition of suspension aid. FIGS. 5, 6, and 7 provide images of the separated activator systems for Examples D, E, and F, respectively.

The focus of the investigation then shifted to the interaction of the activator system with the polymeric fluid loss additive. Examples C, I, J, and K were prepared and mixed in the same proportions as was Example B. Example C contained Halad®-413 (Acrylonitrile, acrylamide, AMPS grafted on lignite), Example I contained Halad®-200 (heteropolymer of AMPS, acrylamide, N-vinylpyrrolidone, and acrylic acid), Example J contained LAP-1 (polyvinyl alcohol), and Example K contained HZ™-30 (polyacrylamide). Example C showed signs of separation immediately after preparation with a small bottom layer becoming visible. After 3 days, separation of two distinct layers was clearly visible. Example I behaved identically to Example B, remaining stable after preparation and at least 2 days. Examples J and K separated immediately after preparation into distinct layers. Through these observations, it was evident that addition of Halad®-200, which, in comparison to the other polymers tested in this series, is most like Halad®-344 in chemical composition, stabilizes the activator system to enable long shelf life.

Although not definitive at present, the experiments suggest that an acrylic copolymer with charged functionality, when added to the sodium sulfate and sodium hexametaphosphate activator system, creates the most stable combination. Halad®-413, which contains AMPS, separated the least in comparison to the rest of the polymer additives tested; however, the lignite component may very well prevent the desired level of stability.

Addition of a copolymeric additive like Halad®-344 also provided the benefit of imparting fluid loss control to the activated cement slurry without the disadvantages of pre-mixing fluid loss additive with the dry cement mix. The following data shown in Tables 12 and 13 provides a comparison of an Example A activator system with the more stable Example B activator system.

TABLE 12

Example A vs. Example B.

| Activator Type | Pump Time (hr:mins) | Fluid Loss (cc) | 24-hr Crush (psi) |
|---|---|---|---|
| Example A | 6:10 | 82 | 689 |
| Example B | 6:28 | 80 | 658 |

TABLE 13

Examples A and B. 6D and 3D refer to the rheometric decay values at 3 and 6 rpm, respectively. The designations "up" and "down" refer to whether the measurement was taken as RPM was increasing ("up") or decreasing ("down"). The data given in the Table shows viscometer dial readings from a Fann 35 viscometer with a Fann Yield Stress Adapter and a no. 1 spring.

| RPM | | 300 | 200 | 100 | 60 | 30 | 6 | 6D | 3 | 3D |
|---|---|---|---|---|---|---|---|---|---|---|
| | | | | | Example A | | | | | |
| 80° F. | Up | 48 | 32 | 17 | 11 | 6 | 2.5 | | 1 | |
| | Down | 48 | 31 | 16 | 9.5 | 5 | 2 | 0.5 | 1 | 0.5 |
| 130° F. | Up | 27 | 18 | 9 | 6 | 4 | 1.5 | | 1 | |
| | Down | 27 | 16 | 8.5 | 5.5 | 4 | 1 | 0.5 | 1 | 0.5 |
| 180° F. | Up | 21 | 13 | 7 | 5 | 3 | 1.5 | | 1 | |
| | Down | 21 | 13 | 6 | 4.5 | 3 | 1.5 | 0.5 | 1 | 5.5 |
| | | | | | Example B | | | | | |
| 80° F. | Up | 47 | 32 | 17 | 11 | 6 | 3 | | 1 | |
| | Down | 47 | 30 | 15 | 9.5 | 5 | 2 | 0.5 | 1 | 0.5 |
| 130° F. | Up | 27 | 17 | 9 | 6 | 4 | 2 | | 1 | |
| | Down | 27 | 16 | 8.5 | 6 | 4 | 1.5 | 0.5 | 1 | 0.5 |
| 180° F. | Up | 21 | 13 | 7 | 5 | 3 | 1.5 | | 1 | |
| | Down | 21 | 12 | 6 | 4 | 3 | 1 | 0.5 | 1 | 0.5 |

The data indicates that the activator system of the invention (Example B) gives as good or better results in pump time, fluid loss, and 24-h compressive strength measurements when compared to the conventional activator system (Example A). FANN® yield stress adapter (FYSA) rheology measurements taken on activated cement slurries at temperatures of 80° F., 130° F., and 180° F. were comparable for both Example A and B activator systems. Thus, incorporation of the polymeric additive to the activator system lends desirable properties to the cement slurry and set cement matrix, and also causes no detriment to the activated slurry rheology. This is on top of the stabilizing benefit the polymer provides which enables longer shelf life and improved handling. Data collection was performed according to API 10B-2/ISO 10426-2 *Recommended Practice for Testing Well Cements*.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:
placing in the subterranean formation a liquid cement activator composition comprising
water;
an alkali sulfate salt;
a polyphosphate salt; and
a stabilizer polymer comprising
a repeating group that is an ethylene substituted with a group selected from the group consisting of
—C(O)OH, a salt thereof, a substituted or unsubstituted $(C_1-C_{20})$hydrocarbyl ester thereof,
—C(O)NR$^1$$_2$, wherein at each occurrence R$^1$ is independently selected from the group consisting of a substituted or unsubstituted $(C_1-C_{20})$hydrocarbyl, —CN, and
combinations thereof;
wherein at each occurrence the ethylene is independently further substituted or unsubstituted, and
a repeating group that comprises an anionic group.

Embodiment 2 provides the method of Embodiment 1, wherein the method further comprises obtaining or providing the composition, wherein the obtaining or providing of the composition occurs above-surface.

Embodiment 3 provides the method of any one of Embodiments 1-2, wherein the method further comprises obtaining or providing the composition, wherein the obtaining or providing of the composition occurs in the subterranean formation.

Embodiment 4 provides the method of any one of Embodiments 1-3, further comprising combining the cement activator composition with a cement composition.

Embodiment 5 provides the method of Embodiment 4, wherein the combining of the cement activator composition and the cement composition occurs above-surface, wherein placing the liquid cement activator composition in the subterranean formation comprises placing a mixture of the liquid cement activator composition and the cement composition in the subterranean formation.

Embodiment 6 provides the method of any one of Embodiments 4-5, wherein the combining of the cement activator composition and the cement composition occurs in the subterranean formation.

Embodiment 7 provides the method of any one of Embodiments 4-6, wherein about 0.001 wt % to about 99.999 wt % of the combination of the cement activator composition and the cement composition is the cement activator composition.

Embodiment 8 provides the method of any one of Embodiments 4-7, wherein about 10 wt % to about 50 wt % of the combination of the cement activator composition and the cement composition is the cement activator composition.

Embodiment 9 provides the method of any one of Embodiments 4-8, wherein the cement composition comprises Portland cement, pozzolana cement, gypsum cement, high alumina content cement, slag cement, silica cement, or a combination thereof.

Embodiment 10 provides the method of any one of Embodiments 4-9, wherein the cement composition comprises pozzolana cement, wherein the activator composition is about 60% to about 95% of the weight of pozzolana in the cement composition.

Embodiment 11 provides the method of any one of Embodiments 4-10, wherein the cement composition comprises pozzolana-lime cement.

Embodiment 12 provides the method of any one of Embodiments 4-11, wherein the cement composition is a delayed-set cement composition.

Embodiment 13 provides the method of any one of Embodiments 4-12, further comprising curing the combination of the cement activator composition and the cement composition.

Embodiment 14 provides the method of any one of Embodiments 1-13, wherein the water is about 30 wt % to about 95 wt % of the cement activator composition.

Embodiment 15 provides the method of any one of Embodiments 1-14, wherein the water is about 60 wt % to about 80 wt % of the cement activator composition.

Embodiment 16 provides the method of any one of Embodiments 1-15, wherein the alkali sulfate salt is about 0.001 wt % to about 40 wt % of the cement activator composition.

Embodiment 17 provides the method of any one of Embodiments 1-16, wherein the alkali sulfate salt is about 1 wt % to about 15 wt % of the cement activator composition.

Embodiment 18 provides the method of any one of Embodiments 1-17, wherein the alkali sulfate salt comprises potassium sulfate, calcium sulfate, lithium sulfate, sodium sulfate, or a combination thereof.

Embodiment 19 provides the method of any one of Embodiments 1-18, wherein the alkali sulfate salt is sodium sulfate.

Embodiment 20 provides the method of any one of Embodiments 1-19, wherein the polyphosphate salt is about 0.001 wt % to about 30 wt % of the cement activator composition.

Embodiment 21 provides the method of any one of Embodiments 1-20, wherein the polyphosphate salt is about 1 wt % to about 15 wt % of the cement activator composition.

Embodiment 22 provides the method of any one of Embodiments 1-21, wherein the polyphosphate salt comprises a polymeric metaphosphate salt, a phosphate salt, or a combination thereof.

Embodiment 23 provides the method of any one of Embodiments 1-22, wherein the polyphosphate salt comprises sodium hexametaphosphate, sodium trimetaphosphate, sodium tetrametaphosphate, sodium pentametaphosphate, sodium heptametaphosphate, sodium octametaphosphate, and combinations thereof.

Embodiment 24 provides the method of any one of Embodiments 1-23, wherein the polyphosphate salt is sodium hexametaphosphate.

Embodiment 25 provides the method of any one of Embodiments 1-24, wherein the cement activator composition further comprises a dispersant.

Embodiment 26 provides the method of Embodiment 25, wherein the dispersant is about 0.001 wt % to about 40 wt % of the cement activator composition.

Embodiment 27 provides the method of any one of Embodiments 25-26, wherein the dispersant is about 1 wt % to about 25 wt % of the cement activator composition.

Embodiment 28 provides the method of any one of Embodiments 25-27, wherein the dispersant comprises a superplasticizing dispersant, a sulfonated-formaldehyde-based dispersant, a polycarboxylated ether dispersant, or a combination thereof.

Embodiment 29 provides the method of any one of Embodiments 25-28, wherein the dispersant is a polycarboxylated ether.

Embodiment 30 provides the method of any one of Embodiments 1-29, wherein the stabilizer polymer is about 0.001 wt % to about 30 wt % of the cement activator composition.

Embodiment 31 provides the method of any one of Embodiments 1-30, wherein the stabilizer polymer is about 0.1 wt % to about 10 wt % of the cement activator composition.

Embodiment 32 provides the method of any one of Embodiments 1-31, wherein the repeating group that is a substituted ethylene is about 0.001 mol % to about 99.999 mol % of the stabilizer polymer.

Embodiment 33 provides the method of any one of Embodiments 1-32, wherein the repeating group that is a substituted ethylene is about 0.001 mol % to about 25 mol % of the stabilizer polymer.

Embodiment 34 provides the method of any one of Embodiments 1-33, wherein the repeating group that is a substituted ethylene has the structure:

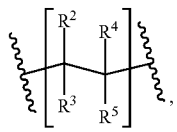

wherein
$R^2$, $R^3$, and $R^4$ are independently selected from the group consisting of —H, and substituted or unsubstituted $(C_1$-$C_{50})$hydrocarbyl interrupted by 0, 1, 2, or 3 groups independently selected from the group consisting of —O—, —S—, substituted or unsubstituted —NH—, —$(CH_2$—$CH_2$—$O)_{n1}$—, and —$(CH_2$—$CH_2$—$CH_2$—$O)_{n1}$—, wherein n1 is about 1 to about 10,000;
$R^5$ is independently selected from the group consisting of C(O)OH, a salt thereof, a substituted or unsubstituted $(C_1$-$C_{20})$hydrocarbyl ester thereof, —C(O)$NR^1_2$, wherein at each occurrence $R^1$ is independently selected from the group consisting of a substituted or unsubstituted $(C_1$-$C_{20})$hydrocarbyl, and —CN.

Embodiment 35 provides the method of Embodiment 34, wherein $R^2$, $R^3$, and $R^4$ are independently unsubstituted $(C_1$-$C_{20})$hydrocarbyl.

Embodiment 36 provides the method of any one of Embodiments 34-35, wherein $R^2$, $R^3$, and $R^4$ are independently $(C_1$-$C_{10})$alkyl.

Embodiment 37 provides the method of any one of Embodiments 34-36, wherein $R^2$, $R^3$, and $R^4$ are —H.

Embodiment 38 provides the method of any one of Embodiments 34-37, wherein $R^5$ is —C(O)$NR^1_2$, wherein at each occurrence $R^1$ is independently unsubstituted $(C_1$-$C_{20})$hydrocarbyl.

Embodiment 39 provides the method of any one of Embodiments 34-38, wherein $R^5$ is —C(O)$NR^1_2$, wherein at each occurrence $R^1$ is $(C_1$-$C_5)$alkyl.

Embodiment 40 provides the method of any one of Embodiments 34-39, wherein $R^5$ is —C(O)$NR^1_2$, wherein $R^1$ is methyl.

Embodiment 41 provides the method of any one of Embodiments 34-40, wherein the repeating group that is a substituted ethylene has the structure:

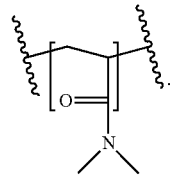

Embodiment 42 provides the method of any one of Embodiments 1-41, wherein the repeating group that comprises an anionic group is about 0.001 mol % to about 99.999 mol % of the stabilizer polymer.

Embodiment 43 provides the method of any one of Embodiments 1-42, wherein the repeating group that comprises an anionic group is about 25 mol % to about 99.999 mol % of the stabilizer polymer.

Embodiment 44 provides the method of any one of Embodiments 1-43, wherein the anionic group in the repeating group that comprises the anionic group is in the form of an acid or a salt thereof.

Embodiment 45 provides the method of any one of Embodiments 1-44, wherein the repeating group that comprises an anionic group has the structure:

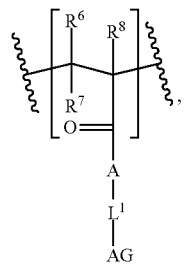

wherein
A is selected from the group consisting of —O— and —$NR^9$—,
$R^6$, $R^7$, $R^8$, $R^9$ are independently selected from the group consisting of —H, and a substituted or unsubstituted $(C_1$-$C_{50})$hydrocarbyl interrupted by 0, 1, 2, or 3 groups independently selected from the group consisting of —O—, —S—, substituted or unsubstituted —NH—, —$(CH_2$—$CH_2$—$O)_{n2}$—, and —$(CH_2$—$CH_2$—$CH_2$—$O)_{n2}$—, wherein n2 is about 1 to about 10,000,
$L^1$ is selected from the group consisting of a bond and a substituted or unsubstituted $(C_1$-$C_{50})$hydrocarbylene interrupted by 0, 1, 2, or 3 groups independently selected from the group consisting of —O—, —S—, substituted or unsubstituted —NH—, —$(CH_2$—$CH_2$—$O)_{n3}$—, and —$(CH_2$—$CH_2$—$CH_2$—$O)_{n3}$—, wherein n3 is about 1 to about 10,000, and
AG is the anionic group.

Embodiment 46 provides the method of Embodiment 45, wherein A is —$NR^9$—.

Embodiment 47 provides the method of Embodiment 46, wherein $R^9$ is selected from the group consisting of —H and $(C_1$-$C_{10})$alkyl.

Embodiment 48 provides the method of any one of Embodiments 46-47, wherein A is —NH—.

Embodiment 49 provides the method of any one of Embodiments 45-48, wherein $R^6$, $R^7$, $R^8$ are independently selected from the group consisting of —H and unsubstituted $(C_1$-$C_{20})$hydrocarbyl.

Embodiment 50 provides the method of any one of Embodiments 45-49, wherein $R^6$, $R^7$, $R^8$ are independently selected from the group consisting of —H and unsubstituted $(C_1-C_{10})$alkyl.

Embodiment 51 provides the method of any one of Embodiments 45-50, wherein $R^6$, $R^7$, $R^8$ are —H.

Embodiment 52 provides the method of any one of Embodiments 45-51, wherein $L^1$ is $(C_1-C_{20})$hydrocarbylene that is unsubstituted or substituted with a $(C_1-C_{10})$alkyl and otherwise unsubstituted.

Embodiment 53 provides the method of any one of Embodiments 45-52, wherein $L^1$ is $(C_1-C_{20})$alkylene that is unsubstituted or substituted with a $(C_1-C_5)$alkyl and otherwise unsubstituted.

Embodiment 54 provides the method of any one of Embodiments 45-53, wherein $L^1$ is $(C_1-C_{10})$alkylene that is unsubstituted or substituted with a methyl and otherwise unsubstituted.

Embodiment 55 provides the method of any one of Embodiments 45-54, wherein $L^1$ is a 2-methyl substituted prop-1,2-ylene.

Embodiment 56 provides the method of any one of Embodiments 45-55, wherein $L^1$ has the structure:

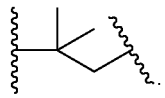 [SMILES: *CC(*)(C)C]

Embodiment 57 provides the method of any one of Embodiments 45-56, wherein AG is —S(O)(O)—OH or a salt thereof.

Embodiment 58 provides the method of any one of Embodiments 1-57, wherein the repeating group that comprises an anionic group has the structure:

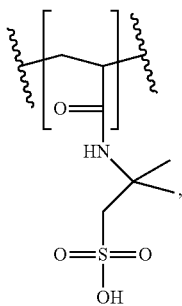

wherein the —S(O)(O)OH is in the form of an acid or a salt thereof.

Embodiment 59 provides the method of any one of Embodiments 1-58, wherein the stabilizer polymer comprises repeating groups having the structure:

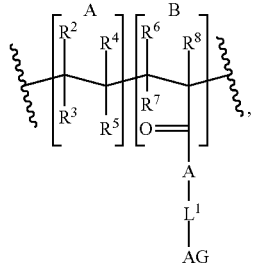

wherein at each occurrence, the repeating units independently occur in the direction shown or in the opposite direction, the repeating units have a block or random copolymer arrangement, $R^2$, $R^3$, and $R^4$ are independently selected from the group consisting of —H, and substituted or unsubstituted $(C_1-C_{50})$hydrocarbyl interrupted by 0, 1, 2, or 3 groups independently selected from the group consisting of —O—, —S—, substituted or unsubstituted —NH—, —(CH$_2$—CH$_2$—O)$_{n1}$—, and —(CH$_2$—CH$_2$—CH$_2$—O)$_{n1}$—, wherein n1 is about 1 to about 10,000, $R^5$ is independently selected from the group consisting of —C(O)OH, a salt thereof, a substituted or unsubstituted $(C_1-C_{20})$hydrocarbyl ester thereof, —C(O)NR$^1_2$, wherein at each occurrence $R^1$ is independently selected from the group consisting of a substituted or unsubstituted $(C_1-C_{20})$hydrocarbyl, and

—CN,

A is selected from the group consisting of —O— and —NR$^9$—, $R^6$, $R^7$, $R^8$, $R^9$ are independently selected from the group consisting of —H, and a substituted or unsubstituted $(C_1-C_{50})$hydrocarbyl interrupted by 0, 1, 2, or 3 groups independently selected from the group consisting of —O—, —S—, substituted or unsubstituted —NH—, —(CH$_2$—CH$_2$—O)$_{n2}$—, and —(CH$_2$—CH$_2$—CH$_2$—O)$_{n2}$—, wherein n2 is about 1 to about 10,000, $L^1$ is selected from the group consisting of a bond and a substituted or unsubstituted $(C_1-C_{50})$hydrocarbylene interrupted by 0, 1, 2, or 3 groups independently selected from the group consisting of —O—, —S—, substituted or unsubstituted —NH—, —(CH$_2$—CH$_2$—O)$_{n3}$—, and —(CH$_2$—CH$_2$—CH$_2$—O)$_{n3}$—, wherein n3 is about 1 to about 10,000, AG is the anionic group, repeating group A is about 0.001 mol % to about 99.999 mol % of the stabilizer polymer, and repeating group B is about 0.001 mol % to about 99.999 mol % of the stabilizer polymer.

Embodiment 60 provides the method of any one of Embodiments 1-59, wherein the stabilizer polymer comprises repeating groups having the structure:

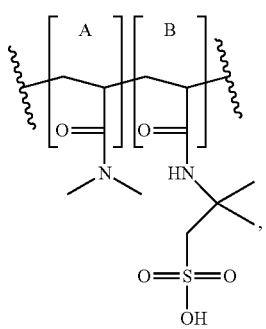

wherein
the —S(O)(O)OH group is in the form of an acid or a salt thereof,
repeating group A is about 0.001 mol % to about 99.999 mol % of the stabilizer polymer, and
repeating group B is about 0.001 mol % to about 99.999 mol % of the stabilizer polymer.

Embodiment 61 provides the method of any one of Embodiments 1-60, wherein the stabilizer polymer further comprises a repeating unit formed from a vinyl-substituted nitrogen-containing ($C_1$-$C_{20}$)heterocycle.

Embodiment 62 provides the method of Embodiment 61, wherein the repeating unit formed from a vinyl-substituted nitrogen-containing ($C_1$-$C_{20}$)heterocycle is about 0.001 mol % to about 99.999 mol % of the stabilizer polymer.

Embodiment 63 provides the method of any one of Embodiments 61-62, wherein the repeating unit formed from a vinyl-substituted nitrogen-containing ($C_1$-$C_{20}$)heterocycle is about 5 mol % to about 50 mol % of the stabilizer polymer.

Embodiment 64 provides the method of any one of Embodiments 61-63, wherein the vinyl group of the vinyl-substituted nitrogen-containing ($C_1$-$C_{20}$)heterocycle is substituted on a nitrogen atom of the nitrogen-containing ($C_1$-$C_{20}$)heterocycle.

Embodiment 65 provides the method of any one of Embodiments 61-64, wherein the vinyl-substituted nitrogen-containing ($C_1$-$C_{20}$)heterocycle is N-vinylpyrrolidone.

Embodiment 66 provides the method of any one of Embodiments 1-65, wherein the stabilizer polymer further comprises an acrylic acid repeating unit.

Embodiment 67 provides the method of Embodiment 66, wherein the acrylic acid repeating unit is about 0.001 mol % to about 55 mol % of the stabilizer polymer.

Embodiment 68 provides the method of any one of Embodiments 1-67, wherein the repeating group that is a substituted ethylene is an acrylamide repeating unit, wherein the repeating group that comprises an anionic group is a 2-acrylamido-2-methylpropane sulfonic acid or salt thereof repeating unit, wherein the stabilizer polymer further comprises an acrylic acid repeating unit and a N-vinylpyrrolidone repeating unit.

Embodiment 69 provides the method of any one of Embodiments 1-68, wherein the stabilizer polymer further comprises an acrylonitrile repeating unit.

Embodiment 70 provides the method of Embodiment 69, wherein the acrylonitrile repeating unit is about 0.001 mol % to about 10 mol % of the stabilizer polymer.

Embodiment 71 provides the method of any one of Embodiments 69-70, wherein the repeating group that is a substituted ethylene is an acrylamide repeating unit, wherein the repeating group that comprises an anionic group is a 2-acrylamido-2-methylpropane sulfonic acid repeating unit or salt thereof.

Embodiment 72 provides the method of any one of Embodiments 1-71, wherein the cement activator composition further comprises calcium chloride, triethanolamine, sodium silicate, zinc formate, calcium acetate, sodium hydroxide, water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 73 provides the method of any one of Embodiments 1-72, wherein the placing of the cement activator composition in the subterranean formation comprises pumping the cement activator composition through a tubular disposed in a wellbore and into the subterranean formation.

Embodiment 74 provides a system for performing the method of any one of Embodiments 1-73, the system comprising:
    a tubular disposed in the subterranean formation; and
    a pump configured to pump the cement activator composition in the subterranean formation through the tubular.

Embodiment 75 provides a method of treating a subterranean formation, the method comprising:
    placing in the subterranean formation a liquid cement activator composition comprising
        water that is about 30 wt % to about 95 wt % of the liquid cement activator composition;
        an alkali sulfate salt that is about 0.001 wt % to about 40 wt % of the liquid cement activator composition;
        a polyphosphate salt that is about 0.001 wt % to about 30 wt % of the liquid cement activator composition; and
        a stabilizer polymer that is about 0.001 wt % to about 30 wt % of the liquid cement activator composition, the stabilizer polymer comprising repeating groups having the structure:

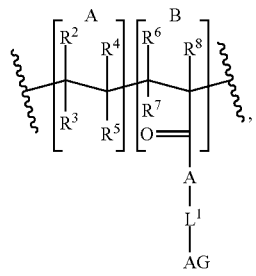

wherein
- at each occurrence, the repeating units independently occur in the direction shown or in the opposite direction,
- the repeating units have a block or random copolymer arrangement,
- $R^2$, $R^3$, and $R^4$ are independently selected from the group consisting of —H, and substituted or unsubstituted $(C_1\text{-}C_{50})$hydrocarbyl interrupted by 0, 1, 2, or 3 groups independently selected from the group consisting of —O—, —S—, substituted or unsubstituted —NH—, —$(CH_2\text{—}CH_2\text{—}O)_{n1}$—, and —$(CH_2\text{—}CH_2\text{—}CH_2\text{—}O)_{n1}$—, wherein n1 is about 1 to about 10,000,
- $R^5$ is independently selected from the group consisting of
    - —C(O)OH, a salt thereof, a substituted or unsubstituted $(C_1\text{-}C_{20})$hydrocarbyl ester thereof,
    - —C(O)NR$^1{}_2$, wherein at each occurrence $R^1$ is independently selected from the group consisting of a substituted or unsubstituted $(C_1\text{-}C_{20})$hydrocarbyl, and
    - —CN,
- A is selected from the group consisting of —O— and —NR$^9$—,
- $R^6$, $R^7$, $R^8$, $R^9$ are independently selected from the group consisting of —H, and a substituted or unsubstituted $(C_1\text{-}C_{50})$hydrocarbyl interrupted by 0, 1, 2, or 3 groups independently selected from the group consisting of —O—, —S—, substituted or unsubstituted —NH—, —$(CH_2\text{—}CH_2\text{—}O)_{n2}$—, and —$(CH_2\text{—}CH_2\text{—}CH_2\text{—}O)_{n2}$—, wherein n2 is about 1 to about 10,000,
- $L^1$ is selected from the group consisting of a bond and a substituted or unsubstituted $(C_1\text{-}C_{50})$hydrocarbylene interrupted by 0, 1, 2, or 3 groups independently selected from the group consisting of —O—, —S—, substituted or unsubstituted —NH—, —$(CH_2\text{—}CH_2\text{—}O)_{n3}$—, and —$(CH_2\text{—}CH_2\text{—}CH_2\text{—}O)_{n3}$—, wherein n3 is about 1 to about 10,000,
- AG is the anionic group,
- repeating group A is about 0.001 mol % to about 25 mol % of the stabilizer polymer, and
- repeating group B is about 25 mol % to about 99.999 mol % of the stabilizer polymer.

Embodiment 76 provides a method of treating a subterranean formation, the method comprising:
placing in the subterranean formation a liquid cement activator composition comprising
- water that is about 30 wt % to about 95 wt % of the liquid cement activator composition;
- an alkali sulfate salt that is about 0.001 wt % to about 40 wt % of the liquid cement activator composition;
- a polyphosphate salt that is about 0.001 wt % to about 30 wt % of the liquid cement activator composition; and
- a stabilizer polymer that is about 0.001 wt % to about 30 wt % of the liquid cement activator composition, the stabilizer polymer comprising repeating groups having the structure:

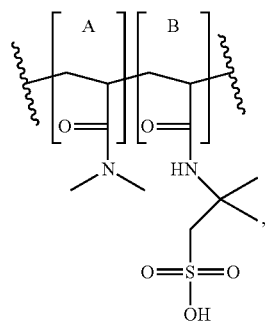

wherein
- at each occurrence, the repeating units independently occur in the direction shown or in the opposite direction,
- the repeating units have a block or random copolymer arrangement,
- the —S(O)(O)OH group is in the form of an acid or a salt thereof,
- repeating group A is about 0.001 mol % to about 25 mol % of the stabilizer polymer, and
- repeating group B is about 25 mol % to about 99.999 mol % of the stabilizer polymer.

Embodiment 77 provides a system comprising:
- a tubular disposed in a subterranean formation; and
- a pump configured to pump a liquid cement activator composition in the subterranean formation through the tubular, wherein the cement activator composition comprises
    - water;
    - an alkali sulfate salt;
    - a polyphosphate salt; and
    - a stabilizer polymer comprising
        - a repeating group that is an ethylene substituted with a group selected from the group consisting of
            - —C(O)OH, a salt thereof, a substituted or unsubstituted $(C_1\text{-}C_{20})$hydrocarbyl ester thereof,
            - —C(O)NR$^1{}_2$, wherein at each occurrence $R^1$ is independently selected from the group consisting of a substituted or unsubstituted $(C_1\text{-}C_{20})$hydrocarbyl,
            - —CN, and
            - combinations thereof,
        - wherein at each occurrence the ethylene is independently further substituted or unsubstituted, and
        - a repeating group that comprises an anionic group.

Embodiment 78 provides a liquid cement activator composition for treatment of a subterranean formation, the cement activator composition comprising:
- water;
- an alkali sulfate salt;
- a polyphosphate salt; and
- a stabilizer polymer comprising
    - a repeating group that is an ethylene substituted with a group selected from the group consisting of
        - —C(O)OH, a salt thereof, a substituted or unsubstituted $(C_1\text{-}C_{20})$hydrocarbyl ester thereof,
        - —C(O)NR$^1{}_2$, wherein at each occurrence $R^1$ is independently selected from the group consisting of a substituted or unsubstituted $(C_1\text{-}C_{20})$hydrocarbyl,
        - —CN, and
        - combinations thereof,
    - wherein at each occurrence the ethylene is independently further substituted or unsubstituted, and
    - a repeating group that comprises an anionic group.

Embodiment 79 provides a liquid cement activator composition for treatment of a subterranean formation, the cement activator composition comprising:
water that is about 30 wt % to about 95 wt % of the liquid cement activator composition;
an alkali sulfate salt that is about 0.001 wt % to about 40 wt % of the liquid cement activator composition;
a polyphosphate salt that is about 0.001 wt % to about 30 wt % of the liquid cement activator composition; and
a stabilizer polymer that is about 0.001 wt % to about 30 wt % of the liquid cement activator composition, the stabilizer polymer comprising repeating groups having the structure:

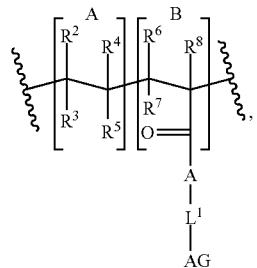

wherein
at each occurrence, the repeating units independently occur in the direction shown or in the opposite direction,
the repeating units have a block or random copolymer arrangement,
$R^2$, $R^3$, and $R^4$ are independently selected from the group consisting of —H, and substituted or unsubstituted $(C_1\text{-}C_{50})$hydrocarbyl interrupted by 0, 1, 2, or 3 groups independently selected from the group consisting of —O—, —S—, substituted or unsubstituted —NH—, —$(CH_2-CH_2-O)_{n1}$—, and —$(CH_2-CH_2-CH_2-O)_{n1}$—, wherein n1 is about 1 to about 10,000,
$R^5$ is independently selected from the group consisting of
—C(O)OH, a salt thereof, a substituted or unsubstituted $(C_1\text{-}C_{20})$hydrocarbyl ester thereof,
—C(O)NR$^1_2$, wherein at each occurrence $R^1$ is independently selected from the group consisting of a substituted or unsubstituted $(C_1\text{-}C_{20})$hydrocarbyl, and
—CN,
A is selected from the group consisting of —O— and —NR$^9$—,
$R^6$, $R^7$, $R^8$, $R^9$ are independently selected from the group consisting of —H, and a substituted or unsubstituted $(C_1\text{-}C_{50})$hydrocarbyl interrupted by 0, 1, 2, or 3 groups independently selected from the group consisting of —O—, —S—, substituted or unsubstituted —NH—, —$(CH_2-CH_2-O)_{n2}$—, and —$(CH_2-CH_2-CH_2-O)_{n2}$—, wherein n2 is about 1 to about 10,000,
$L^1$ is selected from the group consisting of a bond and a substituted or unsubstituted $(C_1\text{-}C_{50})$hydrocarbylene interrupted by 0, 1, 2, or 3 groups independently selected from the group consisting of —O—, —S—, substituted or unsubstituted —NH—, —$(CH_2-CH_2-O)_{n3}$—, and —$(CH_2-CH_2-CH_2-O)_{n3}$—, wherein n3 is about 1 to about 10,000,
AG is the anionic group,
repeating group A is about 0.001 mol % to about 25 mol % of the stabilizer polymer, and
repeating group B is about 25 mol % to about 99.999 mol % of the stabilizer polymer.

Embodiment 80 provides a method of preparing a composition for treatment of a subterranean formation, the method comprising:
forming a liquid cement activator composition for treatment of a subterranean formation, the cement activator composition comprising:
water;
an alkali sulfate salt;
a polyphosphate salt; and
a stabilizer polymer comprising
a repeating group that is an ethylene substituted with a group selected from the group consisting of
—C(O)OH, a salt thereof, a substituted or unsubstituted $(C_1\text{-}C_{20})$hydrocarbyl ester thereof,
—C(O)NR$^1_2$, wherein at each occurrence $R^1$ is independently selected from the group consisting of a substituted or unsubstituted $(C_1\text{-}C_{20})$hydrocarbyl, CN, and
combinations thereof,
wherein at each occurrence the ethylene is independently further substituted or unsubstituted, and
a repeating group that comprises an anionic group.

Embodiment 81 provides the method, system, or composition of any one or any combination of Embodiments 1-80 optionally configured such that all elements or options recited are available to use or select from.

What is claimed is:
1. A method of treating a subterranean formation, comprising:
placing a pre-formulated liquid cement activator composition in the subterranean formation, the pre-formulated liquid cement activator composition having fluid loss control properties in addition to liquid cement activation properties and comprising:
water;
about 1 wt % to about 15 wt % of an alkali sulfate salt comprising potassium sulfate, lithium sulfate, sodium sulfate, or any combination thereof;
a polyphosphate salt; and
a stabilizer polymer comprising:
a repeating group that is an ethylene substituted with a group selected from the group consisting of:
—C(O)OH, a salt thereof, a substituted or unsubstituted $(C_1\text{-}C_{20})$hydrocarbyl ester thereof,
—C(O)NR$^1_2$, wherein at each occurrence $R^1$ is independently selected from the group consisting of a substituted or unsubstituted $(C_1\text{-}C_{20})$hydrocarbyl,
—CN, and
any combination thereof;
wherein at each occurrence the ethylene is independently further substituted or unsubstituted, and
a repeating group that comprises an anionic group;
stabilizing the homogeneity of the alkali sulfate salt and the polyphosphate salt in the pre-formulated liquid cement activator composition with the stabilizer polymer; and
combining the pre-formulated liquid cement activator composition with a set-delayed cement composition comprising pozzolana-lime cement and excluding fluid loss control agents; and
activating the set-delayed cement composition with the alkali sulfate salt and the polyphosphate salt in the pre-formulated liquid cement activator composition, whereby the set-delayed cement composition cures.

2. The method of claim 1, wherein the combining of the pre-formulated liquid cement activator composition and the set-delayed cement composition occurs in the subterranean formation, and wherein about 10 wt % to about 50 wt % of the combination of the pre-formulated liquid cement activator composition and the cement composition is the pre-formulated liquid cement activator composition.

3. The method of claim 1, wherein the set-delayed cement composition further comprises Portland cement, gypsum cement, high alumina content cement, slag cement, silica cement, or any combination thereof.

4. The method of claim 1, wherein the pre-formulated liquid cement activator is composition about 60% to about 95% of the weight of pozzolana in the set-delayed cement composition.

5. The method of claim 1, wherein the polyphosphate salt is about 1 wt % to about 15 wt % of the pre-formulated liquid cement activator composition, and wherein the polyphosphate salt comprises sodium hexametaphosphate, sodium trimetaphosphate, sodium tetrametaphosphate, sodium pentametaphosphate, sodium heptametaphosphate, sodium octametaphosphate, or any combination thereof.

6. The method of claim 1, wherein the pre-formulated liquid cement activator composition further comprises a dispersant, wherein the dispersant is about 1 wt % to about 25 wt % of the liquid cement activator composition, and wherein the dispersant comprises a superplasticizing dispersant, a sulfonated-formaldehyde-based dispersant, a polycarboxylated ether dispersant, or any combination thereof.

7. The method of claim 1, wherein the repeating group that is a substituted ethylene has the structure:

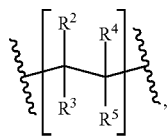

wherein
$R^2$, $R^3$, and $R^4$ are independently selected from the group consisting of —H, and substituted or unsubstituted $(C_1$-$C_{50})$hydrocarbyl interrupted by 0, 1, 2, or 3 groups independently selected from the group consisting of —O—, —S—, substituted or unsubstituted —NH—, —($CH_2$—$CH_2$—O$)_{n1}$—, and —($CH_2$—$CH_2$—$CH_2$—O$)_{n1}$—, wherein n1 is 1 to about 10,000;
$R^5$ is independently selected from the group consisting of:
—C(O)OH, a salt thereof, a substituted or unsubstituted $(C_1$-$C_{20})$hydrocarbyl ester thereof,
—C(O)$NR^1_2$, wherein at each occurrence $R^1$ is independently selected from the group consisting of a substituted or unsubstituted $(C_1$-$C_{20})$hydrocarbyl,
—CN, and
any combination thereof.

8. The method of claim 7, wherein $R^2$, $R^3$, and $R^4$ are independently —H or $(C_1$-$C_{10})$alkyl, and wherein $R^5$ is —C(O)$NR^1_2$, wherein at each occurrence $R^1$ is $(C_1$-$C_5)$ alkyl.

9. The method of claim 7, wherein the repeating group that is a substituted ethylene has the structure:

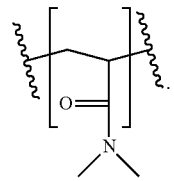

10. The method of claim 1, wherein the repeating group that comprises an anionic group has the structure:

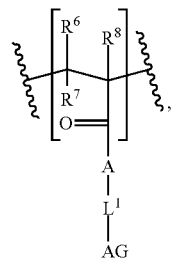

wherein:
A is selected from the group consisting of —O— and —$NR^9$—,
$R^6$, $R^7$, $R^8$, $R^9$ are independently selected from the group consisting of —H, and a substituted or unsubstituted $(C_1$-$C_{50})$hydrocarbyl interrupted by 0, 1, 2, or 3 groups independently selected from the group consisting of —O—, —S—, substituted or unsubstituted —NH—, —($CH_2$—$CH_2$—O$)_{n2}$—, and —($CH_2$—$CH_2$—$CH_2$—O$)_{n2}$—, wherein n2 is 1 to about 10,000,
$L^1$ is selected from the group consisting of a bond and a substituted or unsubstituted $(C_1$-$C_{50})$hydrocarbylene interrupted by 0, 1, 2, or 3 groups independently selected from the group consisting of —O—, —S—, substituted or unsubstituted —NH—, —($CH_2$—$CH_2$—O$)_{n3}$—, and —($CH_2$—$CH_2$—$CH_2$—O$)_{n3}$—, wherein n3 is 1 to about 10,000, and
AG is the anionic group.

11. The method of claim 10, wherein $R^6$, $R^7$, $R^8$ are independently selected from the group consisting of —H and unsubstituted $(C_1$-$C_{10})$alkyl, and wherein A is —$NR^9$—, and wherein $R^9$ is selected from the group consisting of —H and $(C_1$-$C_{10})$alkyl.

12. The method of claim 10, wherein $L^1$ is a 2-methyl substituted prop-1,2-ylene.

13. The method of claim 1, wherein the repeating group that comprises an anionic group has the structure:

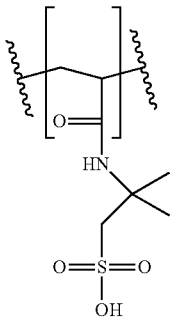

wherein the —S(O)(O)OH is in the form of an acid or a salt thereof.

14. The method of claim 1, wherein the stabilizer polymer comprises repeating groups having the structure:

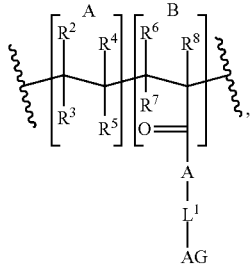

wherein:
at each occurrence, the repeating units independently occur in the direction shown or in the opposite direction,
the repeating units have a block or random copolymer arrangement,
$R^2$, $R^3$, and $R^4$ are independently selected from the group consisting of —H, and substituted or unsubstituted $(C_1-C_{50})$hydrocarbyl interrupted by 0, 1, 2, or 3 groups independently selected from the group consisting of —O—, —S—, substituted or unsubstituted —NH—, —$(CH_2—CH_2—O)_{n1}$—, and —$(CH_2—CH_2—CH_2—O)_{n1}$—, wherein n1 is 1 to about 10,000,
$R^5$ is independently selected from the group consisting of:
—C(O)OH, a salt thereof, a substituted or unsubstituted $(C_1-C_{20})$hydrocarbyl ester thereof,
$C(O)NR^1_2$, wherein at each occurrence $R^1$ is independently selected from the group consisting of a substituted or unsubstituted $(C_1-C_{20})$hydrocarbyl, CN, and
any combination thereof,
A is selected from the group consisting of —O— and —$NR^9$—,
$R^6$, $R^7$, $R^8$, $R^9$ are independently selected from the group consisting of —H, and a substituted or unsubstituted $(C_1-C_{50})$hydrocarbyl interrupted by 0, 1, 2, or 3 groups independently selected from the group consisting of —O—, —S—, substituted or unsubstituted —NH—, —$(CH_2—CH_2—O)_{n2}$—, and —$(CH_2—CH_2—CH_2—O)_{n2}$—, wherein n2 is 1 to about 10,000, $L^1$ is selected from the group consisting of a bond and a substituted or unsubstituted $(C_1-C_{50})$hydrocarbylene interrupted by 0, 1, 2, or 3 groups independently selected from the group consisting of —O—, —S—, substituted or unsubstituted —NH—, —$(CH_2—CH_2—O)_{n3}$—, and —$(CH_2—CH_2—CH_2—O)_{n3}$—, wherein n3 is 1 to about 10,000,
AG is the anionic group,
repeating group A is about 0.001 mol % to about 99.999 mol % of the stabilizer polymer, and
repeating group B is about 0.001 mol % to about 99.999 mol % of the stabilizer polymer.

15. The method of claim 1, wherein the stabilizer polymer comprises repeating groups having the structure:

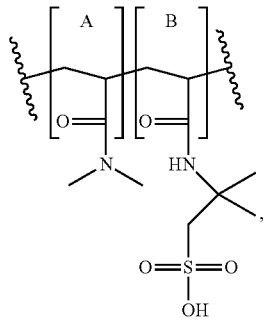

wherein:
the —S(O)(O)OH group is in the form of an acid or a salt thereof,
repeating group A is about 0.001 mol % to about 99.999 mol % of the stabilizer polymer, and
repeating group B is about 0.001 mol % to about 99.999 mol % of the stabilizer polymer.

16. The method of claim 1, wherein the stabilizer polymer further comprises a repeating unit formed from a vinyl-substituted nitrogen-containing $(C_1-C_{20})$heterocycle is about 5 mol % to about 50 mol % of the stabilizer polymer.

17. The method of claim 1, wherein the repeating group that is a substituted ethylene is an acrylamide repeating unit, wherein the repeating group that comprises an anionic group is a 2-acrylamido-2-methylpropane sulfonic acid or salt thereof repeating unit, wherein the stabilizer polymer further comprises an acrylic acid repeating unit and a N-vinylpyrrolidone repeating unit.

* * * * *